United States Patent
Kamakura

(10) Patent No.: US 8,195,900 B2
(45) Date of Patent: Jun. 5, 2012

(54) METHOD WHICH UTILIZES A POWER SAVING FUNCTION OF A STORAGE SYSTEM BY USING PAIR OPERATION INFORMATION

(75) Inventor: Junichi Kamakura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 803 days.

(21) Appl. No.: 12/272,949

(22) Filed: Nov. 18, 2008

(65) Prior Publication Data

US 2010/0070723 A1    Mar. 18, 2010

(30) Foreign Application Priority Data

Sep. 18, 2008    (JP) ................................ 2008-239064

(51) Int. Cl.
*G06F 12/00* (2006.01)
(52) U.S. Cl. ........ 711/162; 711/154; 711/165; 707/654; 707/801
(58) Field of Classification Search .................. 711/154, 711/162, 165; 707/654, 801
See application file for complete search history.

(56) References Cited

U.S. PATENT DOCUMENTS

| | | | | |
|---|---|---|---|---|
| 7,783,833 | B2 * | 8/2010 | Kumagai | ...................... 711/114 |
| 2006/0224845 | A1 * | 10/2006 | Hiraiwa et al. | ............... 711/162 |
| 2007/0079156 | A1 | 4/2007 | Fujimoto et al. | |
| 2008/0010234 | A1 | 1/2008 | Nakagawa et al. | |
| 2008/0270695 | A1 * | 10/2008 | Ninose | .......................... 711/114 |
| 2009/0164780 | A1 * | 6/2009 | Murayama et al. | ........... 713/165 |

FOREIGN PATENT DOCUMENTS

| | | |
|---|---|---|
| JP | 2007-102322 | 4/2007 |
| JP | 2008-15886 | 1/2008 |

* cited by examiner

*Primary Examiner* — Reba I Elmore
(74) *Attorney, Agent, or Firm* — Brundidge & Stanger, P.C.

(57) ABSTRACT

A storage area management method utilizes a storage system power saving function by using copy pair operation information obtained by acquiring an operation schedule of an application host. The method includes retrieving at least one candidate logical volume for creating a primary logical volume from a plurality of storage device groups, judging whether the retrieved candidate logical volume(s) on a primary side satisfies a condition of the primary logical volume, retrieving at least one candidate logical volume for creating a secondary logical volume from the storage device groups, judging whether the retrieved candidate logical volume(s) on a secondary side satisfies a condition of the secondary logical volume, and creating a copy pair based on the retrieving and judging. The method enables appropriate arrangement of the primary and secondary logical volumes, and creation of a copy pair for an appropriate disk device group, thereby managing and saving storage system power.

16 Claims, 17 Drawing Sheets

| 701 | 702 | 703 | 704 | 705 | 700 |
|---|---|---|---|---|---|
| MANAGEMENT ID | PAIR ID | VOLUME ID_P | VOLUME ID_S | COPY TYPE | |
| 1 | PAIR ID001 | LDEV001 | LDEV002 | SI | |
| 2 | PAIR ID002 | LDEV003 | LDEV004 | SI | |
| 3 | PAIR ID004 | LDEV008 | LDEV001 | UR | |

*FIG. 4*

| 801 | 802 | 803 | 804 | 805 | 806 | 807 | 800 |
|---|---|---|---|---|---|---|---|
| MANAGEMENT ID | PAIR ID | COMMAND | TIME | A DAY OF THE WEEK | DATE | CYCLE | |
| 1 | PAIR001 | PAIRRESYNC | 07:00:00 | MONDAY | NULL | WEEKLY | |
| 2 | PAIR001 | PAIRSPLIT | 20:00:00 | MONDAY | NULL | WEEKLY | |
| 3 | PAIR002 | PAIRRESYNC | 07:00:00 | TUESDAY | NULL | WEEKLY | |
| 4 | PAIR002 | PAIRSPLIT | 20:00:00 | TUESDAY | NULL | WEEKLY | |
| 5 | PAIR004 | PAIRRESYNC | 07:00:00 | NULL | 1 | MONTHLY | |
| 6 | PAIR004 | PAIRSPLIT | 07:00:00 | NULL | 1 | MONTHLY | |

*FIG. 5*

| MANAGEMENT ID 1001 | STORAGE ID 1002 | VOLUME ID 1003 | ARRAY GROUP ID 1004 | CAPACITY 1005 | VOLUME ID_P 1006 | VOLUME ID_S 1007 | COPY TYPE 1008 |
|---|---|---|---|---|---|---|---|
| 1 | STORAGE SYSTEM 1 | LDEV001 | 1 | 1000GB | LDEV001 | NULL | SI |
| 2 | STORAGE SYSTEM 1 | LDEV002 | 1 | 1000GB | NULL | LDEV002 | SI |
| 3 | STORAGE SYSTEM 1 | LDEV005 | 1 | 1000GB | NULL | NULL | NULL |
| 4 | STORAGE SYSTEM 1 | LDEV003 | 2 | 1000GB | LDEV003 | NULL | SI |
| 5 | STORAGE SYSTEM 1 | LDEV006 | 2 | 1000GB | NULL | NULL | NULL |
| 6 | STORAGE SYSTEM 1 | LDEV008 | 2 | 1000GB | LDEV008 | NULL | UR |
| 7 | STORAGE SYSTEM 1 | LDEV009 | 2 | 1000GB | NULL | NULL | NULL |
| 8 | STORAGE SYSTEM 1 | LDEV004 | 3 | 1000GB | NULL | LDEV004 | SI |
| 9 | STORAGE SYSTEM 1 | LDEV007 | 3 | 1000GB | NULL | NULL | NULL |

FIG. 8

MIGRATION WIZARD

PRIMARY ▼

MIGRATION TARGET VOLUME SETTING

| SELECTION | STORAGE ID | VOLUME ID | CAPACITY | APPLIED |
|---|---|---|---|---|
| ☑ | STORAGE SYSTEM 1 | LDEV1 | 20.0GB | APPLIED |

CANDIDATE VOLUME SETTING

| SELECTION | STORAGE ID | VOLUME ID | CAPACITY | ADVISABILITY |
|---|---|---|---|---|
| ☑ | STORAGE SYSTEM 1 | LDEV6 | 20.0GB | HIGH |
| ☐ | STORAGE SYSTEM 1 | LDEV9 | 20.0GB | HIGH |

SETTING CONFIRMATION

| MIGRATION TARGET VOLUME SETTING | | MIGRATION DESTINATION VOLUME SETTING | |
|---|---|---|---|
| STORAGE ID | VOLUME ID | STORAGE ID | VOLUME ID |
| STORAGE SYSTEM 1 | LDEV1 | STORAGE SYSTEM 1 | LDEV6 |

[APPLY] [AUTO APPLY]

[CONFIRM] [CANCEL]

*FIG. 9*

| MANAGEMENT ID | STORAGE ID | VOLUME ID | ARRAY GROUP ID | COMMAND | TIME | A DAY OF THE WEEK | DATE | CYCLE |
|---|---|---|---|---|---|---|---|---|
| 1 | STORAGE SYSTEM 1 | LDEV002 | 1 | PAIRRESYNC | 07:00:00 | MONDAY | NULL | WEEKLY |
| 2 | STORAGE SYSTEM 1 | LDEV002 | 1 | PAIRSPLIT | 20:00:00 | MONDAY | NULL | WEEKLY |
| 3 | STORAGE SYSTEM 1 | LDEV004 | 3 | PAIRRESYNC | 07:00:00 | TUESDAY | NULL | WEEKLY |
| 4 | STORAGE SYSTEM 1 | LDEV004 | 3 | PAIRSPLIT | 20:00:00 | TUESDAY | NULL | WEEKLY |

FIG. 12

METHOD WHICH UTILIZES A POWER SAVING FUNCTION OF A STORAGE SYSTEM BY USING PAIR OPERATION INFORMATION

CLAIM OF PRIORITY

The present application claims priority from Japanese patent applications JP 2008-239064 filed on Sep. 18, 2008, the contents of which is hereby incorporated by reference into this application.

BACKGROUND

This invention relates to a power saving function of a storage system, and more particularly, to power saving realized by a volume management method which focuses on a copy pair.

Recent system enlargement has been accompanied by an increase in power consumption. Thus, power saving has become increasingly important for the purpose of reducing management costs and in view of environmental problems. For a storage system, too, the power saving problem has become important. Conventionally, the storage system has had a power ON/OFF function for each disk as a power saving function, and has realized power saving by effectively utilizing the power saving function.

The effective utilization of the power saving function necessitates separation of frequently used disks from less frequently used disks. For the disk separation based on the use frequency of disks, there is a method which focuses on an operation schedule of an application host as disclosed in, for example, JP 2007-102322 A. Further, there is another method which migrates a storage area between storage systems as disclosed in, for example, JP 2008-015886 A.

SUMMARY

However, because of further enlargement of a system which includes a plurality of storage systems, several tens of thousands of disks are now present in each storage system. If such systems of various types are mixedly present, acquisition of the operation schedule of the application host as described above is difficult. In a large-scale system, migration of a storage area between the storage systems may be difficult.

This invention has been made to solve the problems, and provides a method which effectively utilizes a power saving function of a storage system by using copy pair operation information that can be easily obtained by acquiring an operation schedule of an application host.

A representative aspect of this invention is as follows. That is, there is provided a storage area management method used in a computer system which includes a plurality of host computers, a plurality of storage systems, and a management computer coupled to the plurality of storage systems. Each of the plurality of storage systems includes a plurality of storage devices, and a controller for controlling the plurality of storage devices. The controller include a first interface coupled to the plurality of host computers, a second interface coupled to the plurality of storage devices, a processor coupled to the first interface and the second interface, and a memory coupled to the processor. Each of the plurality of host computers includes an interface coupled to the plurality of storage systems, a processor coupled to the interface, and a memory coupled to the processor. The each of the plurality of storage systems further includes a plurality of storage device groups each including at least one storage device. The each of the plurality of storage systems creates a plurality of logical volumes by using real storage areas of a plurality of the storage devices included in the plurality of storage device groups to provide the created plurality of logical volumes to the plurality of host computers; and creates a copy pair which includes a primary logical volume to be provided to one of the plurality of host computers which executes a task, and a secondary logical volume for saving a copy of data stored in the primary logical volume. The storage area management method includes a first step of obtaining, by the management computer, information on the plurality of storage device groups and information on the copy pair from the plurality of storage systems; a second step of retrieving, by the management computer, at least one candidate logical volume for creating the primary logical volume from the plurality of storage device groups of the plurality of storage systems by referring to the obtained information on the copy pair; a third step of judging, by the management computer, whether or not the retrieved at least one candidate logical volume on a primary side satisfies a condition of the primary logical volume; a fourth step of setting, by the management computer, an operation schedule of the secondary logical volume; a fifth step of retrieving, by the management computer, at least one candidate logical volume for creating the secondary logical volume from the plurality of storage device groups by referring to the obtained information on the copy pair; a sixth step of judging, by the management computer, whether or not the retrieved at least one candidate logical volume on a secondary side satisfies a condition of the secondary logical volume by referring to the set operation schedule; and a seventh step of creating, by the management computer, a copy pair from the at least one candidate logical volume on the primary side and the at least one candidate logical volume on the secondary side based on results of the second and the fifth steps of retrieving and results of the third, the fourth and the sixth steps of judging.

The embodiment of this invention enables appropriate arrangement of the primary logical volume and secondary logical volume included in the disk device group, and creation of a copy pair for an appropriate disk device group. Thus, storage system power can be efficiently managed, and the power saving function can be effectively utilized.

BRIEF DESCRIPTION OF THE DRAWINGS

The present invention can be appreciated by the description which follows in conjunction with the following figures, wherein:

FIG. 4 is an explanatory diagram illustrating an example of a copy pair information table in accordance with the embodiment of this invention;

FIG. 5 is an explanatory diagram illustrating an example of an operation schedule table in accordance with the embodiment of this invention;

FIG. 8 is an explanatory diagram illustrating an example of a combined information table in accordance with the embodiment of this invention;

FIG. 9 is an explanatory diagram illustrating an example of the migration setting screen in accordance with the embodiment of this invention;

FIG. 12 is an explanatory diagram illustrating an example of a combined information table in accordance with the embodiment of this invention;

DETAILED DESCRIPTION OF THE PREFERRED EMBODIMENT

Figure 1:
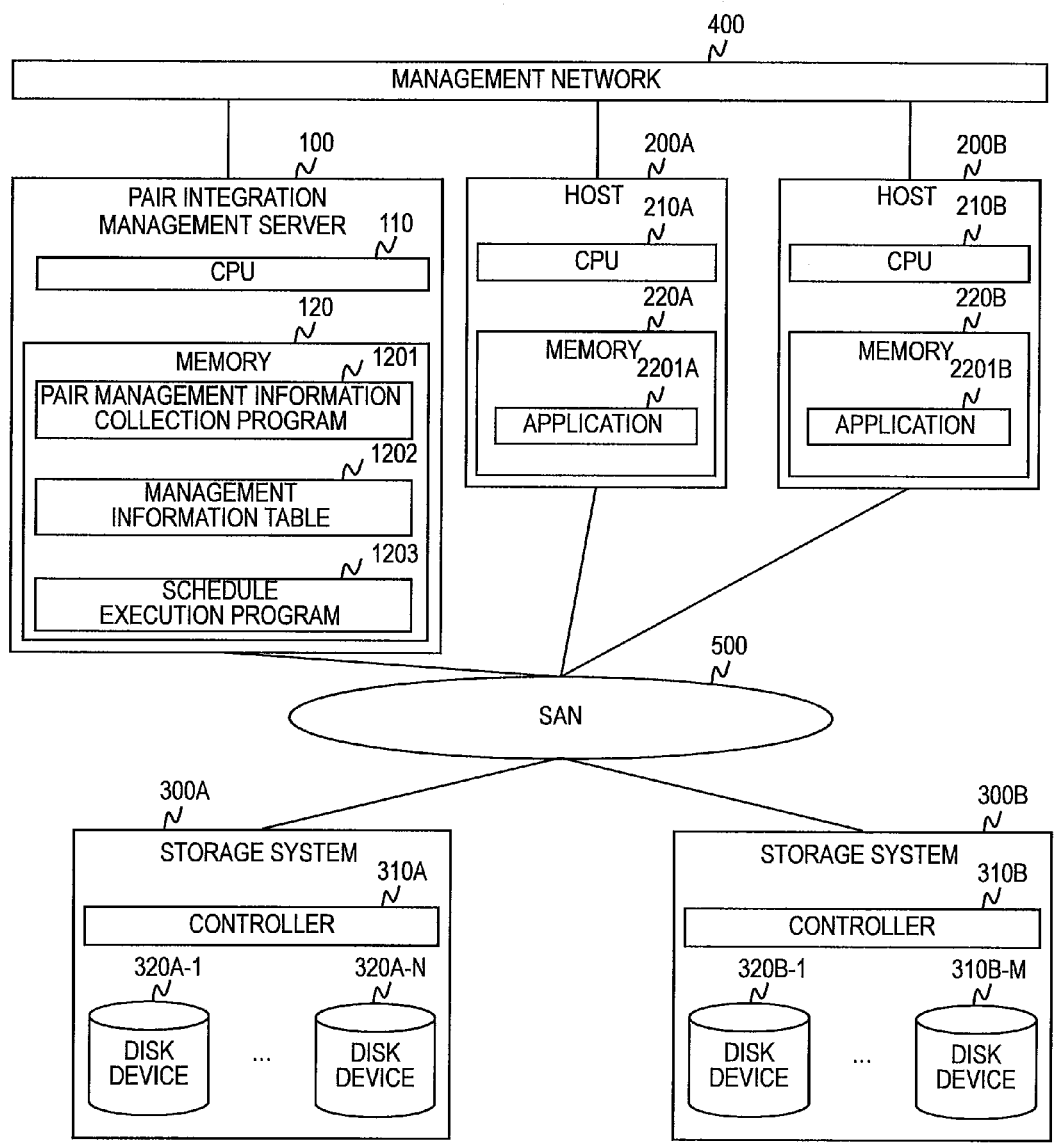
FIG. 1 is a block diagram illustrating a configuration of a computer system in accordance with an embodiment of this invention.

FIG. 1 is a block diagram illustrating a configuration of a computer system according to an embodiment of this invention.

The computer system includes a pair integration management server 100, a host 200 (200A to 200N), and a storage system 300 (300A and 300B). Hereinafter, the host 200 (200A to 200N) and the storage system 300 (300A and 300B) will be described respectively as a host 200 and a storage system 300 unless distinguished otherwise.

The pair integration management server 100 and the host 200 are intercoupled via a management network 400. The pair integration management server 100 and the host 200 are coupled to the storage system 300 via a storage area network (SAN) 500.

The pair integration management server 100 manages copy pairs and copy groups of all the storage systems 300 in the computer system.

The copy pair is constituted of an optional storage area and a storage area created when data stored in the optional storage area is backed up. There are two uses of a backup for periodic backing-up and for disaster recovery. For the periodic backing-up, a local copy for creating a copy pair in the same storage system is generally used. For the disaster recovery, a remote copy for creating a copy pair in a storage system 300 separate from a storage system which includes a copying-source storage area is used.

The pair integration management server 100 includes a CPU 110, and a memory 120 coupled to the CPU. The memory 120 stores a pair management information collection program 1201, a management information table 1202, and a schedule execution program 1203. The pair management information collection program 1201 and the schedule execution program 1203 are executed by the CPU 110.

The pair management information collection program 1201 is for collecting pieces of pair management information. The management information table 1202 stores the pieces of pair management information collected by the pair management information collection program 1201. The schedule execution program 1203 executes predetermined processing according to a set operation schedule.

The host 200 is a computer which executes tasks. The host 200 includes a CPU 210 (210A and 210B), and a memory 220 (220A and 220B) coupled to the CPU 210 (210A and 210B). The memory 220 (220A and 220B) stores an application 2201 (2201A and 2201B) for realizing a task. The application 2201 (2201A and 2201B) is executed by the CPU 210 (210A and 210B).

The storage system 300 provides a storage area used by the host 200. The storage system 300 includes a controller 310 (310A and 310B) for controlling the storage system 300, and a plurality of disk devices 320 (320A and 320B) coupled to the controller 310 (310A and 310B). Hereinafter, unless distinguished otherwise, the controllers 310A and 310B and the disk devices 320A and 320B will be described respectively as a controller 310 and a disk device 320.

Figure 2:
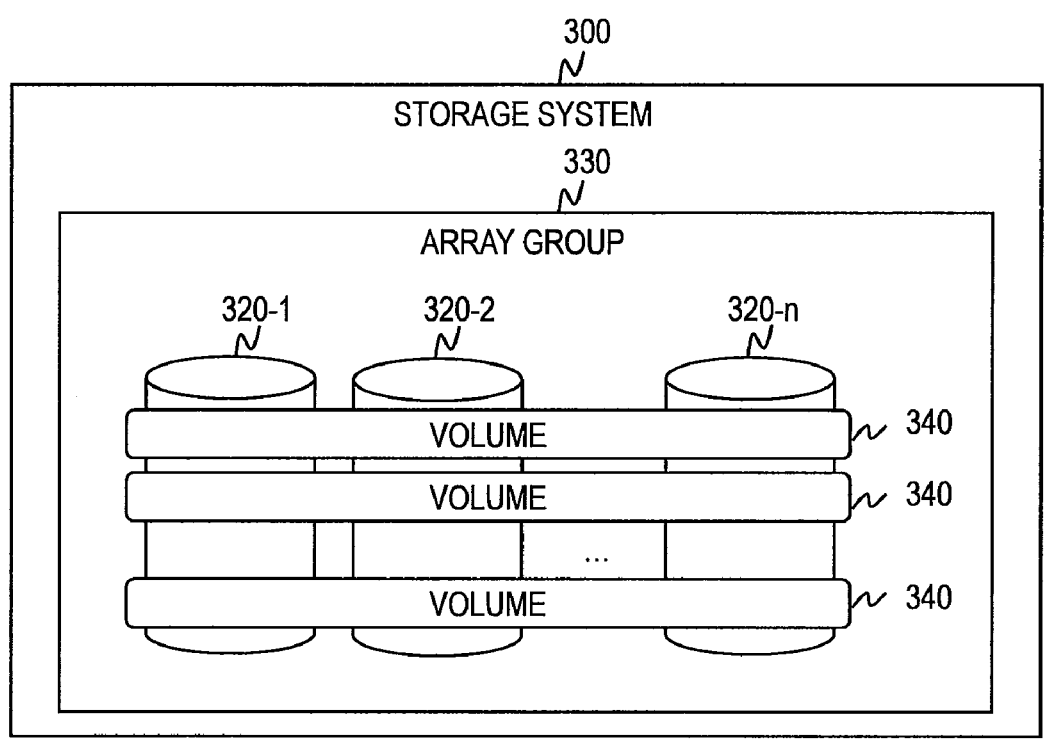
FIG. 2 is an explanatory diagram illustrating a storage area which a storage system provides to a host in accordance with the embodiment of this invention.

FIG. 2 illustrates a storage area which the storage system 300 provides to the host 200 according to the embodiment of this invention.

The storage system 300 includes an array group 330 constituted of the plurality of disk devices 320, and creates a virtual volume 340 in the array group 330 to provide the virtual volume 340 to the host 200. While the provided virtual volume 340 is used, the disk devices 320 constituting the array group 330 are actually operated. Hereinafter, the virtual volume 340 will be described as a volume 340.

An outline of this invention will be given below.

The aforementioned copy pair includes primary and secondary volumes. The primary and secondary volumes are ones of the volumes 340.

The primary volume is always operated because the primary volume is used by the host which executes a task. On the other hand, the secondary volume is a volume 340 for backing up the primary volume, and operated when the primary volume is backed up.

When the primary and secondary volumes are mixed in the same array group 330, the primary volume is always operated, and thus the disk device 320 constituting the array group 330 always has to be operated, necessitating an operation of the secondary volume which does not have to be operated originally. Thus, power of the storage system 300 cannot be efficiently managed. Further, a problem similar to the aforementioned problem with the conventional technology occurs in the array group 330 which includes the primary volume and the unused volume 340.

To solve the aforementioned problem, this invention separates an array group 330 which includes a pair integration management server primary volume from an array group 330 which includes a secondary volume, and arranges the volumes 340 so that the number of array groups 330 to be used can be reduced as much as possible. In this case, the array group 330 which includes the secondary volume includes the unused volume 340.

This arrangement enables separation of an array group 330 which is always operated from an array group 330 which is operated only when needed. As a result, the power of the storage system 300 can be efficiently managed, and a power saving function of the storage system 300 can be effectively utilized.

Operation time is set for each secondary volume. By separating one array group 330 from another based on operation time cycles, the power of the storage system 300 can be more efficiently managed. As a result, the power saving function of the storage system 300 can be effectively utilized.

When a new copy pair is created, the copy pair is created for an optimal array group 330 based on the aforementioned processing. Thus, the power of the storage system 300 can be efficiently managed.

In other words, this invention is realized in such a manner that the pair integration management server first sorts out the array groups 330 in which primary and secondary volumes are mixed (hereinafter, referred to as first processing), secondly further sorts out the array groups 330 which include secondary volumes based on operation time cycles of the secondary volumes (hereinafter, referred to as second processing), and thirdly creates a new copy pair in the optimal array group 330 based on the first processing and the second processing when the copy pair is created (hereinafter, referred to as third processing).

The embodiment of this invention when a new copy pair is created in a currently used storage system 300 will be described below.

The pair integration management server 100 periodically executes the pair management information collection program 1201 to obtain information regarding the storage system 300, and stores the obtained information in the management information table 1202. The pair integration management server 100 refers to the management information table 1202 to execute the first processing.

The management information table 1202 includes a volume information table 600 for managing correspondence between a volume 340 and an array group 330, a copy pair information table 700 for managing information indicating which of primary and secondary volumes a volume 340 is, and an operation schedule table 800 for managing operation information for a copy pair. The management information table 1202 may include other tables. Tables managed by the pair integration management server 100 will be described below.

Figure 3:
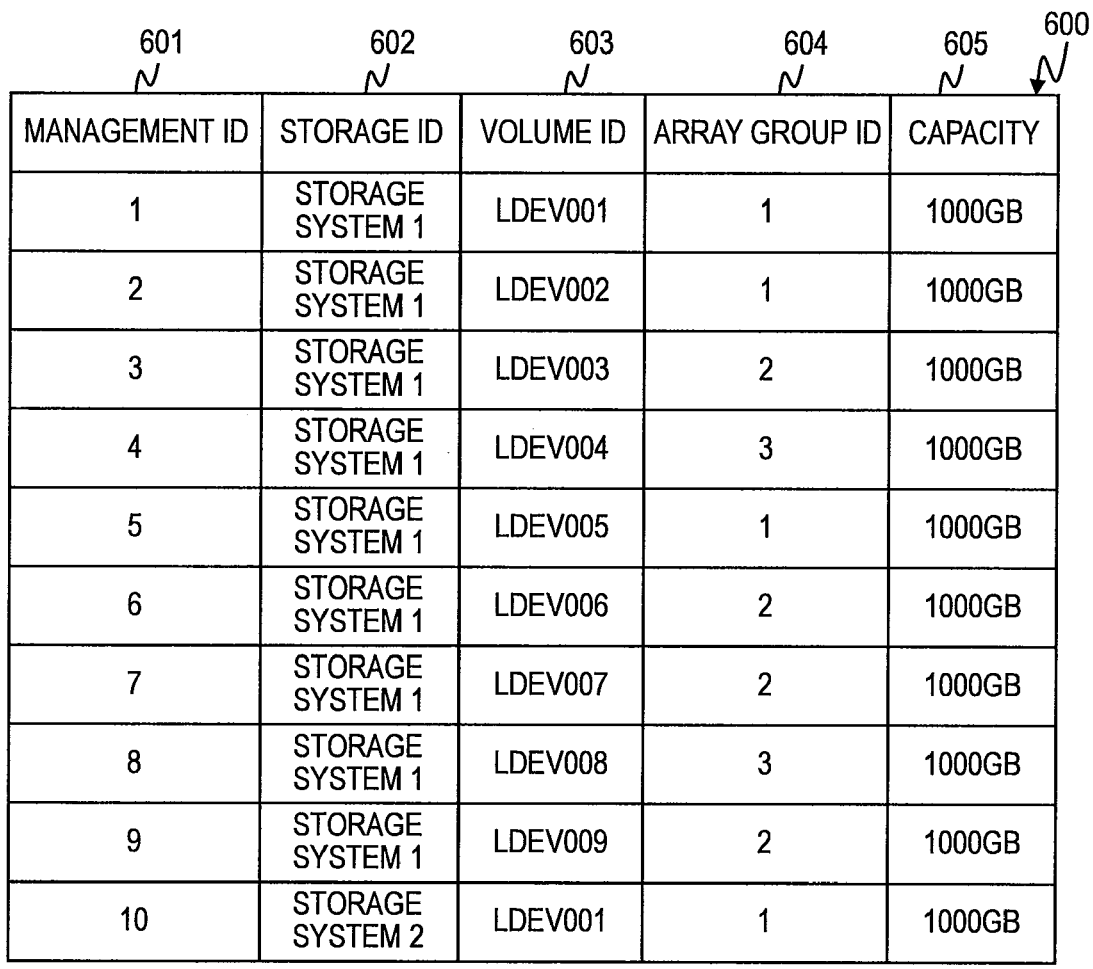
FIG. 3 is an explanatory diagram illustrating an example of a volume information table in accordance with the embodiment of this invention.

FIG. 3 illustrates an example of the volume information table 600 according to the embodiment of this invention.

The volume information table 600 includes a management ID 601, a storage ID 602, a volume ID 603, an array group ID 604, and a capacity 605.

The management ID 601 stores a unique identifier for managing an entry of the volume information table 600. The storage ID stores an identifier for uniquely specifying a storage system 300. The volume ID 603 stores an identifier for uniquely specifying a volume 340 created in the storage system 300. The array group ID 604 stores an identifier for uniquely specifying an array group 330 constituted in the storage system 300. The capacity 605 stores a value indicating a capacity of the volume 340. FIG. 3 illustrates a part of the volume information table 600. The volume information table 600 stores pieces of information of other storage systems 300.

FIG. 4 illustrates an example of the copy pair information table 700 according to the embodiment of this invention.

The copy pair information table 700 includes a management ID 701, a pair ID 702, a volume ID_P 703, a volume ID_S 704, and a copy type 705.

The management ID 701 stores a unique identifier for managing an entry of the copy pair information table 700.

The pair ID 702 stores an identifier for uniquely specifying a copy pair.

The volume ID_P 703 stores an identifier for uniquely specifying a primary volume of the copy pair.

The volume ID_S 704 stores an identifier for uniquely specifying a secondary volume of the copy pair. Values stored in the volume ID_P 703 and the volume ID_S704 are stored by the same identifiers as those of the volume ID 603.

The copy type 705 stores information indicating a type of the copy pair. Specifically, "SI" is stored in the case of a local copy, and "UR" is stored in the case of a remote copy.

FIG. 4 illustrates a part of the copy pair information table 700. The copy pair information table 700 stores pieces of information of other storage systems 300.

FIG. 5 illustrates an example of the operation schedule table 800 according to the embodiment of this invention.

The operation schedule table 800 includes a management ID 801, a pair ID 802, a command 803, time 804, a day of the week 805, a date 806, and a cycle 807.

The management ID 801 stores an identifier for managing an entry of the operation schedule table 800.

The pair ID 802 stores an identifier for uniquely specifying a copy pair. The pair ID 802 is similar to the pair ID 702.

The command 803 stores a command issued from the pair integration management server 100. Specifically, "Pairresync" is stored when primary and secondary volumes are synchronized, and "Pairsplit" is stored when a synchronized status between the primary and secondary volumes is released. The command 803 may store other commands.

The time 804 stores time of executing the command stored in the command 803. The time 804 may not be set.

The day of the week 805 stores a day of the week of executing the command stored in the command 803. The day of the week 805 may not be set.

The date 806 stores a date of executing the command stored in the command 803.

The cycle 807 stores a cycle of executing the command stored in the command 803.

The storage system 300 performs a copy pair operation based on the aforementioned items. For example, when the management ID 801 indicates an entry of "1", processing of synchronization at 7:00 a.m. on Monday, every week, is executed for a copy pair "Pair 001" of the pair ID 802. When the management ID 801 indicates an entry of "2", processing of releasing synchronization at 8:00 p.m. (20:00) on Monday, every week, is executed for the copy pair "Pair 001" of the pair ID 802. In other words, a secondary volume of the copy pair "Pair 001" is operated from 7:00 a.m. to 8:00 p.m. (20:00) on Monday, every week.

FIG. 5 illustrates only a part of the operation schedule table 800. The operation schedule table 800 stores pieces of information of other storage systems 300.

Processing executed by the pair integration management server 100 will be described below.

Figure 6:
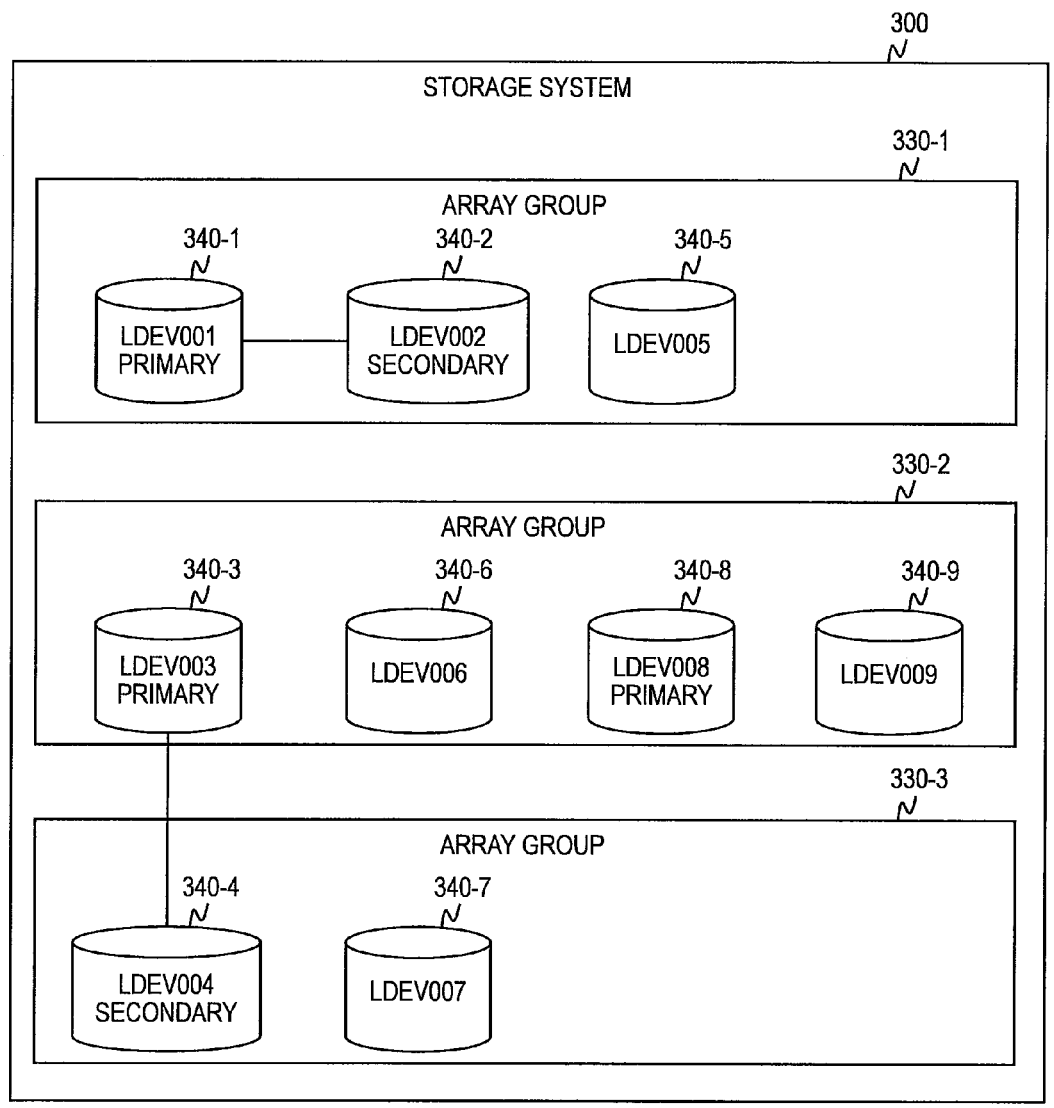
FIG. 6 is an explanatory diagram illustrating a status of the storage system before execution of the processing in accordance with the embodiment of this invention.

FIG. 6 illustrates a status of the storage system 300 before the processing is executed according to the embodiment of this invention. The status of the storage system 300 illustrated in FIG. 6 corresponds to contents of the tables of FIGS. 3 to 5.

The storage system 300 includes array groups 330-1, 330-2, and 330-3.

In the array group 330-1, a volume 340-1 indicated by a volume ID 603 of "LDEV 001", a volume 340-2 indicated by a volume ID 603 of "LDEV 002", and a volume 340-5 indicated by a volume ID 603 of "LDEV 005" are created. The volumes 340-1 and 340-2 make a copy pair, in which volume 340-1 is a primary volume and the volume 340-2 is a secondary volume. The volume 340-5 is an unused volume 340.

In the array group 330-2, a volume 340-3 indicated by a volume ID 603 of "LDEV 003", a volume 340-6 indicated by a volume ID 603 of "LDEV 006", a volume 340-8 indicated by a volume ID 603 of "LDEV 008", and a volume 340-9 indicated by a volume ID 603 of "LDEV 009" are created. The volume 340-3 and a volume 340-4 of the array group 330-3 make a copy pair, in which the volume 340-3 is a primary volume and the volume 340-4 is a secondary volume. The volume 340-8 and another volume of another storage system (not shown) make a copy pair (remote copy), in which the volume 340-8 is a primary volume. The volumes 340-6 and 340-9 are unused volumes 340.

In the array group 330-3, the volume 340-4 indicated by the volume ID 603 of "LDEV 004", and a volume 340-7 indicated by a volume ID 603 of "LDEV 007". The volume 340-4 is the secondary volume and makes the copy pair with the volume 340-3. The volume 340-7 is an unused volume 340.

In the status of FIG. 6, the array groups 330-1 and 330-2 have to be always operated, and the array group 330-3 has to be periodically operated. Thus, power is not efficiently managed. In other words, the power saving function of the storage system 300 is not effectively utilized.

According to the embodiment, when a new copy pair is created, the first processing and the second processing are first executed. Then, the copy pair is created. In other words, the third processing is executed.

First, the first processing will be described.

Figure 7:
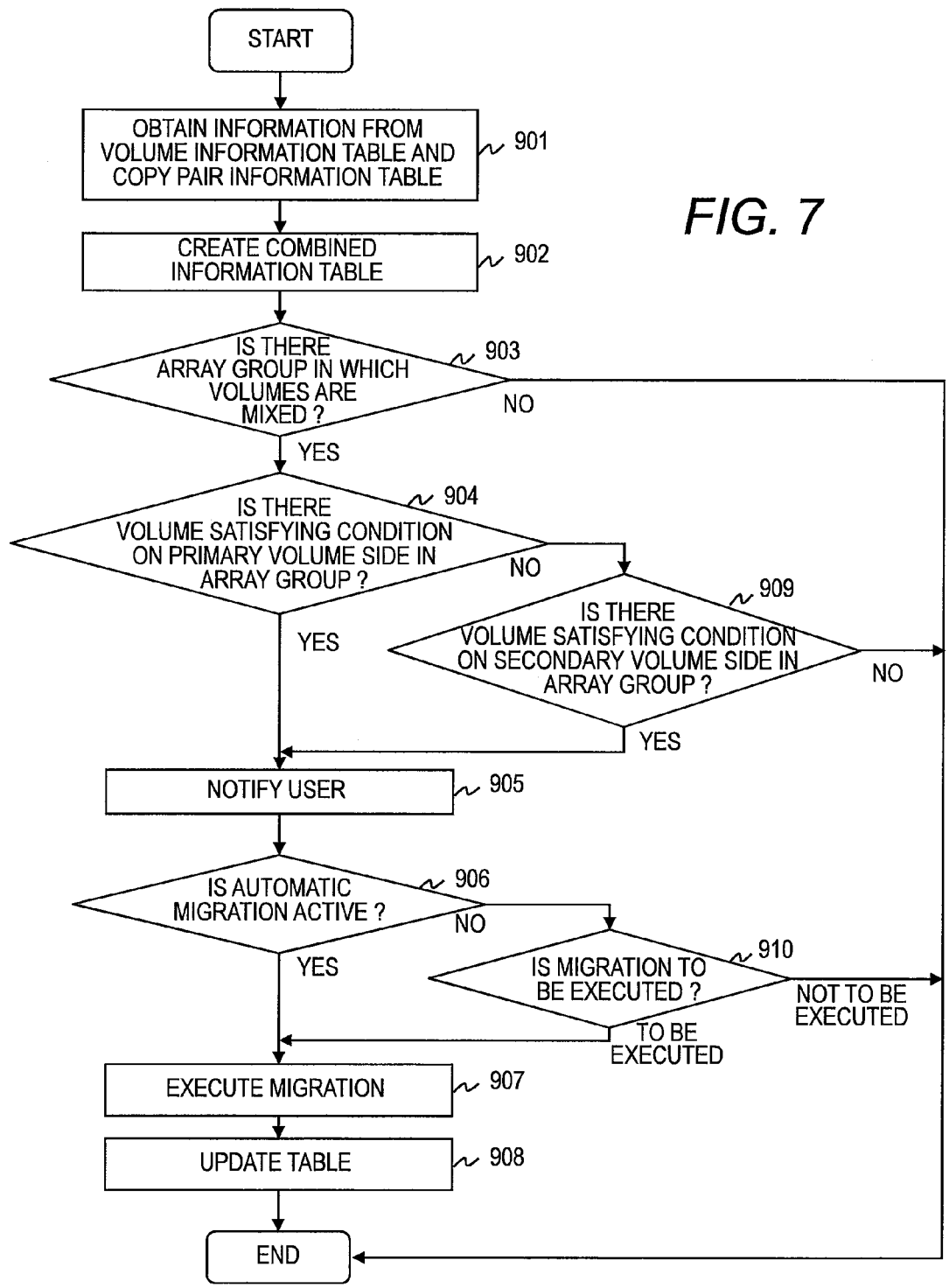
FIG. 7 is a flowchart illustrating the first processing executed by the pair integration management server in accordance with the embodiment of this invention.

FIG. 7 is a flowchart illustrating the first processing executed by the pair integration management server 100 according to the embodiment of this invention.

The first processing is executed by a user's instruction. The first processing may be periodically executed.

The pair integration management server 100 obtains pieces of information from the volume information table 600 and the copy pair information table 700 (901).

The pair integration management server 100 creates a combined information table 1000 illustrated in FIG. 8 which combines the volume information table 600 with the copy pair information table 700 from the obtained pieces of information (902).

FIG. 8 illustrates an example of the combined information table 1000 according to the embodiment of this invention.

The combined information table 1000 includes a management ID 1001, a storage ID 1002, a volume ID 1003, an array group ID 1004, a capacity 1005, a volume ID_P 1006, a volume ID_S 1007, and a copy type 1008.

The management ID 1001 stores an identifier for managing an entry of the combined information table 1000. The storage ID 1002, the volume ID 1003, the array group ID 1004, and the capacity 1005 are respectively similar to the storage ID 602, the volume ID 603, the array group ID 604, and the capacity 605 of the volume information table 600.

The volume ID_P 1006, the volume ID_S 1007, and the copy type 1008 are similar to the volume ID_P 703, the volume ID_S 704, and the copy type 705 of the copy pair information table 700.

The description will be made of the first processing referring to FIG. 7 again.

The pair integration management server 100 refers to the combined information table 1000 to judge whether or not there is any array group 330 (330-1 to 330-3) having a mixture of primary and secondary volumes (903).

Specifically, in the same array group ID 1004, whether or not volumes 340 are present in both of the volume ID_P 1006 and the volume ID_S 1007 is judged. For example, in the array group 330 (in this case, array group 330-1) of an array group ID 1004 of "1", a volume 340 of LDEV 001 is present in the volume ID_P 1006, and a volume 340 of LDEV 002 is present in the volume ID_S 1007. Thus, the pair integration management server 100 judges that primary and secondary volumes are mixed in the array group 330 (array group 330-1 in this case).

If it is judged that no array group 330 (330-1 to 330-3) having a mixture of primary and secondary volumes is present, the pair integration management server 100 finishes the processing.

If it is judged that an array group 330 (330-1 to 330-3) having a mixture of primary and secondary volumes is present, the pair integration management server 100 refers to the combined information table 1000 to judge whether or not a volume 340 satisfying a condition of an optimum primary volume is present in the array group 330 (330-1 to 330-3) (904).

The condition of the optimum primary volume is one selected from a first condition as to whether or not an array group 330 (330-1 to 330-3) having no secondary volume is present (hereinafter, referred to as first condition on primary volume side), and a second condition as to whether or not an array group 330 (330-1 to 330-3) having no secondary volume but a primary volume is present (hereinafter, referred to as second condition on primary volume side). A priority is set higher for the second condition on the primary volume side than for the first condition on the primary volume side. Information regarding the conditions of the optimum primary volume is held by the pair integration management server 100.

For the judgment of the pair integration management server 100 as to whether or not a volume 340 satisfying the condition of the optimum primary volume is present in the array group 330 (330-1 to 330-3), whether or not the second condition on the primary volume side is satisfied may be judged and, if the second condition on the primary volume side is not satisfied, whether or not the first condition on the primary volume side is satisfied may be judged.

In the judgment made in Step 904, specifically, the pair integration management server 100 refers to the volume ID_P 1006 and the volume ID_S 1007 to retrieve an array group 330 (330-1 to 330-3) relevant to the aforementioned conditions.

If it is judged that no volume 340 satisfying the condition of the optimum primary volume is present in the array group 330 (330-1 to 330-3), the pair integration management server 100 judges whether or not a volume 340 satisfying a condition of an optimum secondary volume is present in the array group 330 (330-1 to 330-3) (909).

The condition of the optimum secondary volume is one of a first condition as to whether or not an array group 330 (330-1 to 330-3) having no primary volume is present (hereinafter, referred to as first condition on secondary volume side) and a second condition as to whether or not an array group 330 (330-1 to 330-3) having no primary volume but a secondary volume is present (hereinafter, referred to as second condition on secondary volume side). A priority is set higher for the second condition on the secondary volume side than for the first condition on the secondary volume side. Information regarding the conditions of the optimum secondary volume is held by the pair integration management server 100.

In the judgment made in Step 909, as in the case of Step 904, the pair integration management server 100 refers to the volume ID_P 1006 and the volume ID_S 1007 to retrieve an array group 330 (330-1 to 330-3) relevant to the aforementioned conditions. The conditions of the optimum primary and secondary volumes are mutually exclusive, and thus there is no volume 340 which satisfies both of the conditions.

If it is judged that no volume 340 satisfying the condition of the optimum secondary volume is present in the array group 330 (330-1 to 330-3), the pair integration management server 100 finishes the processing.

If it is judged that a volume 340 satisfying the condition of the optimum secondary volume is present in the array group 330 (330-1 to 330-3), the pair integration management server 100 proceeds to Step 905.

If it is judged in Step 904 that a volume 340 satisfying the condition of the optimum primary volume is present in the array group 330 (330-1 to 330-3), the pair integration management server 100 notifies of presence of the array group 330 (330-1 to 330-3) in which the primary and secondary volumes are mixed (905).

Then, the pair integration management server 100 judges whether or not automatic migration is active (906). If automatic migration has been set beforehand in the pair integration management server 100, the automatic migration is judged to be active.

If the automatic migration is judged to be inactive, the pair integration management server 100 displays a migration setting screen 1100 illustrated in FIG. 9, and the user selects whether to execute migration (910).

FIG. 9 illustrates an example of the migration setting screen 1100 according to the embodiment of this invention.

The migration setting screen 1100 includes a primary/secondary setting section 1110, a migration setting section 1120, a confirm 1130, and a cancel 1140.

The primary/secondary setting section 1110 is for selecting setting of one of a primary volume and a secondary volume. Through such selection of the primary/secondary setting section 1110, setting information of the primary volume or the secondary volume is displayed in the migration setting section 1120. When setting of only one of the primary volume and the secondary volume is allowed, the primary/secondary setting section 1110 is automatically determined by the pair integration management server 100.

The confirm 1130 is a button for instructing an execution start of migration. By operating this button, migration is executed.

The cancel 1140 is a button for instructing an end of migration. By operating this button, execution of migration is canceled or finished.

The migration setting section 1120 is for setting specific migration, and includes a migration target volume setting section 1150, a candidate volume setting section 1160, a setting confirmation section 1170, an apply 1180, and an auto apply 1190.

The migration target volume setting section 1150 is for selecting a migration target volume, and includes a selection section 1151, a storage ID 1152, a volume ID 1153, a capacity 1154, and an applied 1155.

The selection section 1151 is for selecting a volume 340 to be migrated. The storage ID 1152 stores an identifier for uniquely specifying a storage system 300 including a migration target volume 340. The volume ID 1153 stores an identifier for uniquely specifying the migration target volume 340. The capacity 1154 stores a value indicating a capacity of the migration target volume 340. The applied 1155 stores information indicating the migration target volume 340 by operating the selection section 1151.

The storage ID 1152, the volume ID 1153, and the capacity 1154 are similar to the storage ID 602, the volume ID 603, and the capacity 605 of FIG. 3.

The candidate volume setting section 1160 is a selection section for selecting a migration destination volume, and includes a selection section 1161, a storage ID 1162, a volume ID 1163, a capacity 1164, and an advisability 1165.

The selection section 1161 is for selecting a volume 340 of a migration destination. The storage ID 1162 stores an identifier for specifying a storage system 300 including the migration destination volume 340. The volume ID 1163 stores an identifier for specifying the migration destination volume 340. The capacity 1164 stores a value indicating a capacity of the migration destination volume 340. The advisability 1165 stores a priority between a condition of an optimum primary volume and a condition of an optimum secondary volume. However, when an optional volume 340 satisfies two or more conditions, a condition having a higher priority is stored.

For example, "Low" is stored for the first condition on the primary volume side, while "High" is stored for the second condition on the primary volume side. "Low" is stored for the first condition on the secondary volume side, while "High" is stored for the second condition on the secondary volume side.

The storage ID 1162, the volume ID 1163, and the capacity 1164 are similar to the storage ID 602, the volume ID 603, and the capacity 605 of FIG. 3.

The setting confirmation section 1170 is for confirming settings of the migration target volume setting section 1150 and the candidate volume setting section 1160, and includes a migration target volume setting confirmation section 1171 and a migration destination volume setting confirmation section 1172.

The migration target volume setting confirmation section 1171 displays a volume ID 603 of a migration target volume 340, and a storage ID 602 of a storage system 300 including the volume 340. The migration destination volume setting confirmation section 1172 displays a volume ID 603 of a migration destination volume 340, and a storage ID 602 of a storage system 300 including the volume 340.

The apply 1180 is an operating section for applying setting of the migration setting section 1120.

The auto apply 1190 is a button for setting which controls the pair integration management server 100 to perform automatic migration without any setting of the migration setting section 1120. By operating this button, migration is automatically executed thereafter.

The description will be made of the first processing referring to FIG. 7 again.

If cancellation of migration is selected in Step 910, in other words, if the cancel 1140 of the migration setting screen 1100 is operated, the pair integration management server 100 finishes the processing.

If execution of migration is selected in Step 910, in other words, if the confirm 1130 of the migration setting screen 1100 is operated, the pair integration management server 100 executes migration based on the setting of the migration setting screen 1100 (907).

If automatic migration is judged to be active in Step 906, the pair integration management server 100 executes migration (907). When the automatic migration is active, the pair integration management server 100 selects a volume 340 having a higher priority to execute migration.

After the execution of migration, the pair integration management server 100 updates the respective tables (volume information table 600, copy pair information table 700, and operation schedule table 800) to finish the first processing (908).

Figure 10:
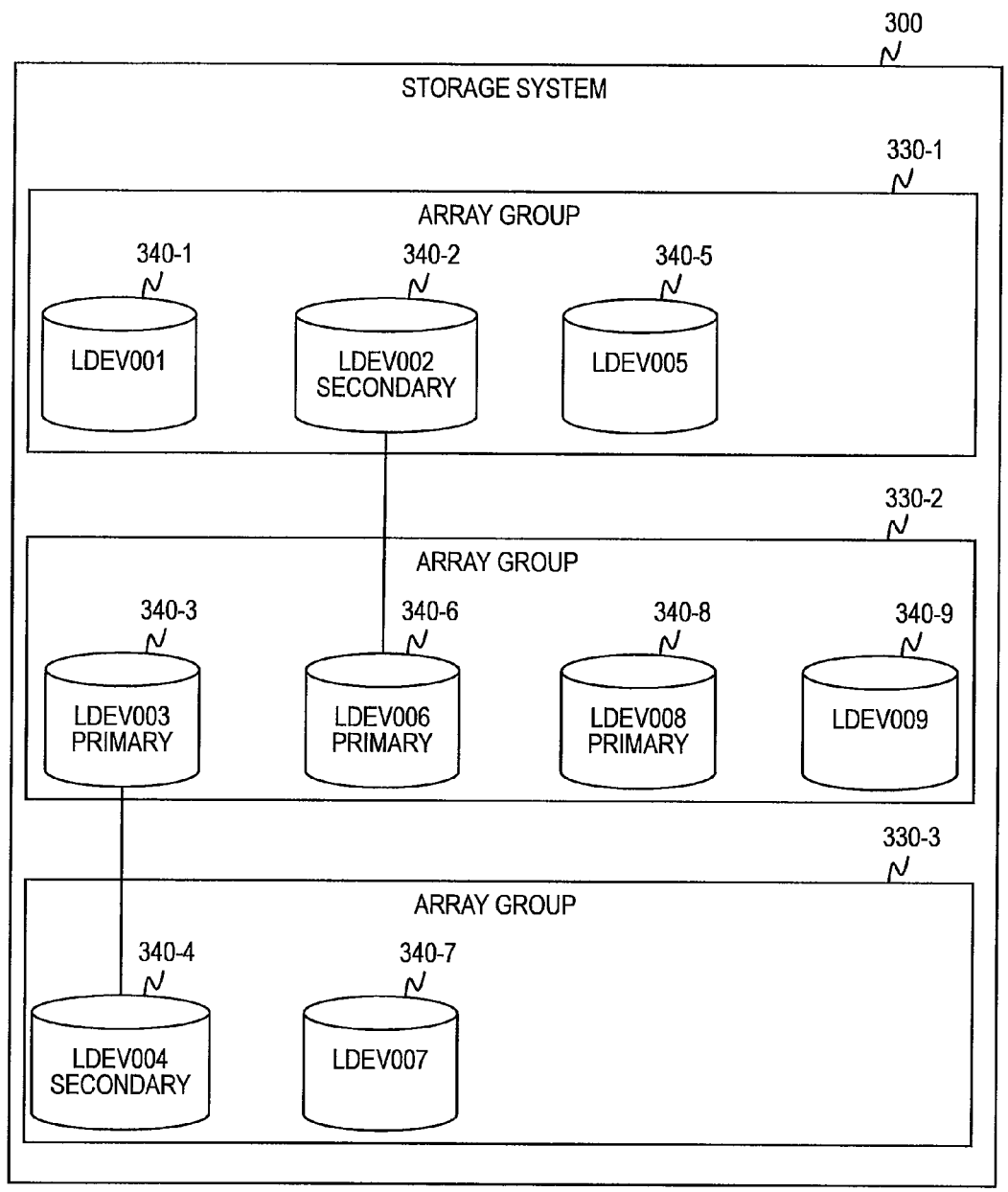
FIG. 10 is an explanatory diagram illustrating a status of the storage system after the execution of the first processing in accordance with the embodiment of this invention.

FIG. 10 illustrates a status of the storage system 300 after the execution of the first processing according to the embodiment of this invention. In the illustrated status, automatic migration is active.

When the first processing is executed in the status of the storage system 300 of FIG. 6, in Step 903, the array group 330-1 in which primary and secondary volumes are mixed is present. Thus, the process proceeds to Step 904.

In Step 904, the volumes 340-6 and 340-9 satisfy the second condition on the primary volume side. Thus, after the process proceeds to Step 905, automatic migration is executed because the automatic migration is active. Specifically, the volume 340-1 of the array group 330-1 is migrated to the volume 340-6 or 340-9 of the array group 330-2. In the embodiment of this invention, the volume 340-1 has been migrated to the volume 340-6. Thus, the storage system 300 is set in a status as illustrated in FIG. 10.

The first processing eliminates the necessity of always operating the array group 330-1, enabling efficient power management of the storage system 300. As a result, the power saving function of the storage system 300 can be effectively utilized.

The second processing will be described below. The second processing is executed in the status of the storage system 300 illustrated in FIG. 10.

Figure 11:
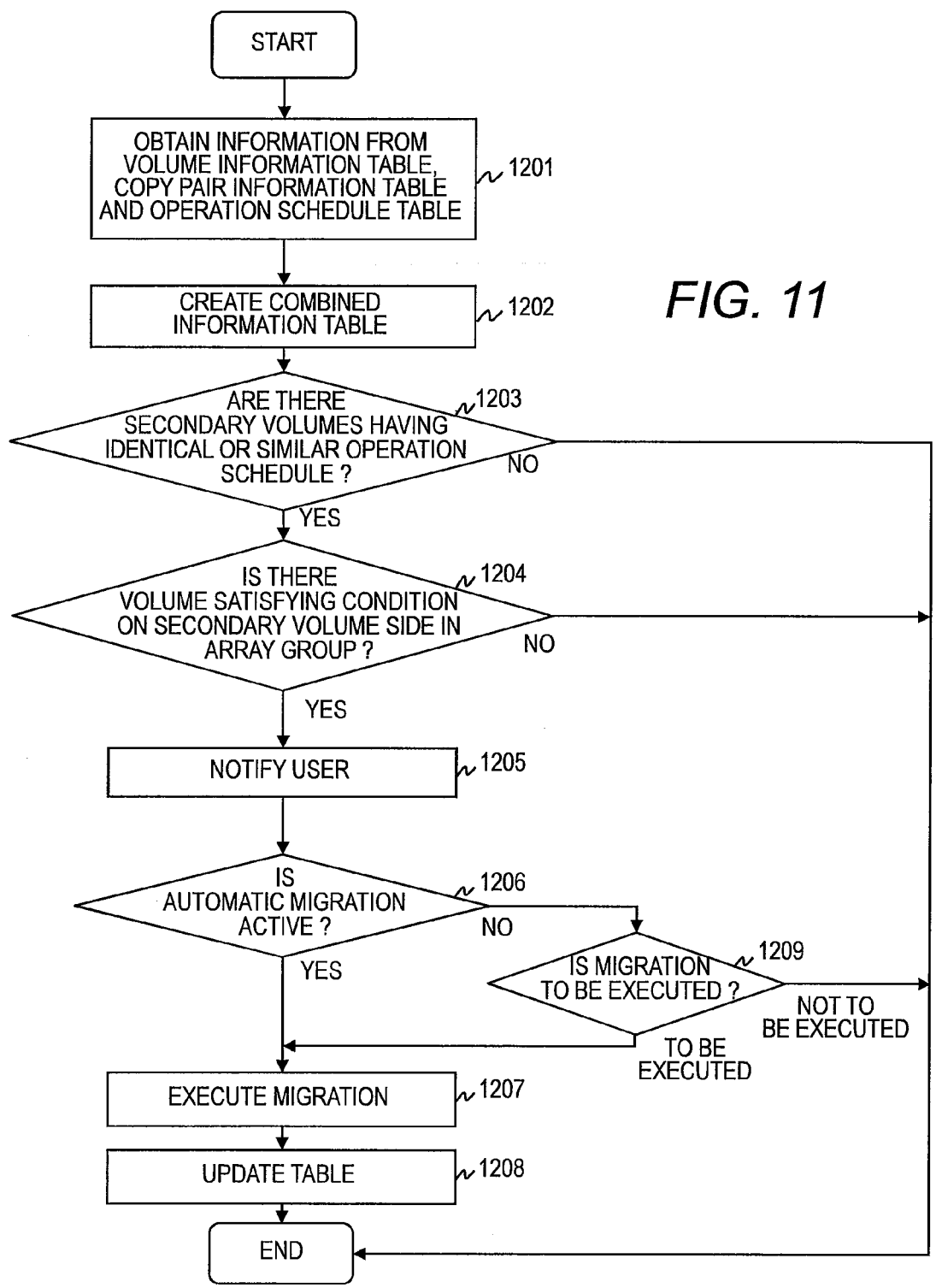
FIG. 11 is a flowchart illustrating the second processing executed by the pair integration management server in accordance with the embodiment of this invention.

FIG. 11 is a flowchart illustrating the second processing executed by the pair integration management server 100 according to the embodiment of this invention.

The second processing is executed by a user's instruction. The second processing may be periodically executed.

The pair integration management server 100 obtains pieces of information from the volume information table 600, the copy pair information table 700 and the operation schedule table 800 (1201).

The pair integration management server 100 creates a combined information table 1300 illustrated in FIG. 12 which combines the volume information table 600 with the operation schedule table 800 from the obtained pieces of information (1202).

FIG. 12 illustrates an example of the combined information table 1300 according to the embodiment of this invention.

The combined information table 1300 includes a management ID 1301, a storage ID 1302, a volume ID 1303, an array group ID 1304, a command 1305, time 1306, a day of the week 1307, a date 1308 and a cycle 1309.

The management ID 1301 stores an identifier for managing an entry of the combined information table 1300. The storage ID 1302, the volume ID 1303, and the array group ID 1304 are respectively similar to the storage ID 602, the volume ID 603, and the array group ID 604 of the volume information table 600.

The command 1305, the time 1306, the day of the week 1307, the date 1308, and the cycle 1309 are similar to the command 803, the time 804, the day of the week 805, the date 806, and the cycle 807 of the operation schedule table 800.

The description will be made of the second processing referring to FIG. 11 again.

The pair integration management server 100 refers to the combined information table 1300 to judge whether or not secondary volumes having an identical or similar operation schedule are present (1203). A specific judgment method will be described below referring to FIGS. 13A and 13B.

If it is judged that no secondary volumes having an identical or similar operation schedule are present, the pair integration management server 100 finishes the processing.

If it is judged that secondary volumes having an identical or similar operation schedule are present, the pair integration management server 100 creates the combined information table 1000 by using pieces of information stored in the volume information table 600 and the copy pair information table 700 of the array group 330 (330-1 to 330-3) including the secondary volumes, and refers to the created combined information table 1000 to judge whether or not a volume 340 satisfying a condition of an optimum secondary volume is present in the array group 330 (330-1 to 330-3) including the secondary volumes (1204). In Step 1204, the same judgment method as that in Step 1203 can be used.

The condition of the optimum secondary volume is one selected from a first condition as to whether or not an array group 330 (330-1 to 330-3) having no primary volume is present, a second condition as to whether or not an array group 330 (330-1 to 330-3) having no primary volume but a secondary volume is present, and a third condition as to whether or not an array group 330 (330-1 to 330-3) having no primary volume but secondary volumes and having overlapping operation schedules of the secondary volumes is present (hereinafter, referred to as third condition on secondary volume side). A priority is set higher for the third condition on the secondary volume side than for the second condition on the secondary volume side, and a priority is set higher for the second condition on the secondary volume side than for the first condition on the secondary volume side. The second processing is different from the first processing in that the second processing has the third condition on the secondary volume side. Information regarding the conditions of the optimum secondary volume is held by the pair integration management server 100.

If it is judged that no volume 340 satisfying the condition of the optimum secondary volume is present in the array group 330 (330-1 to 330-3), the pair integration management server 100 finishes the processing.

If it is judged that a volume 340 satisfying the condition of the optimum secondary volume is present in the array group 330 (330-1 to 330-3), the pair integration management server 100 notifies the user of presence of secondary volumes having an identical or similar operation schedule (1205).

Then, the pair integration management server 100 judges whether or not automatic migration is active (1206). If automatic migration has been set beforehand in the pair integration management server 100, the automatic migration is judged to be active.

If the automatic migration is judged to be inactive, the pair integration management server 100 displays the migration setting screen 1100, and the user selects whether to execute migration (1209).

The migration setting screen 1100 to be displayed is different from that in the first processing in the primary/secondary setting section 1110 and the candidate volume setting section 1160.

Specifically, in the second processing, since only the secondary volume is a migration target, the primary/secondary setting section 1110 displays only "Secondary". In the second processing, because of the condition of the optimum secondary volume, "High" is stored in the advisability 1165 of the candidate volume setting section 1160 in the case of the third condition on the secondary volume side, "Middle" is stored for the second condition on the secondary volume side, and "Low" is stored for the third condition on the secondary volume side.

If cancellation of migration is selected in Step 1209, in other words, if the cancel 1140 of the migration setting screen 1100 is operated, the pair integration management server 100 finishes the processing.

If execution of migration is selected in Step 1209, in other words, if the confirm 1130 of the migration setting screen 1100 is operated, the pair integration management server 100 executes migration based on setting of the migration setting screen 1100 (1207).

If it is judged in Step 1206 that automatic migration is active, the pair integration management server 100 executes migration (1207). When the automatic migration is active, the pair integration management server 100 selects a volume 340 having a higher priority to execute migration.

After execution of the migration, the pair integration management server 100 updates the respective tables (volume information table 600, copy pair information table 700, and operation schedule table 800) to finish the second processing (1208).

Figure 13A:
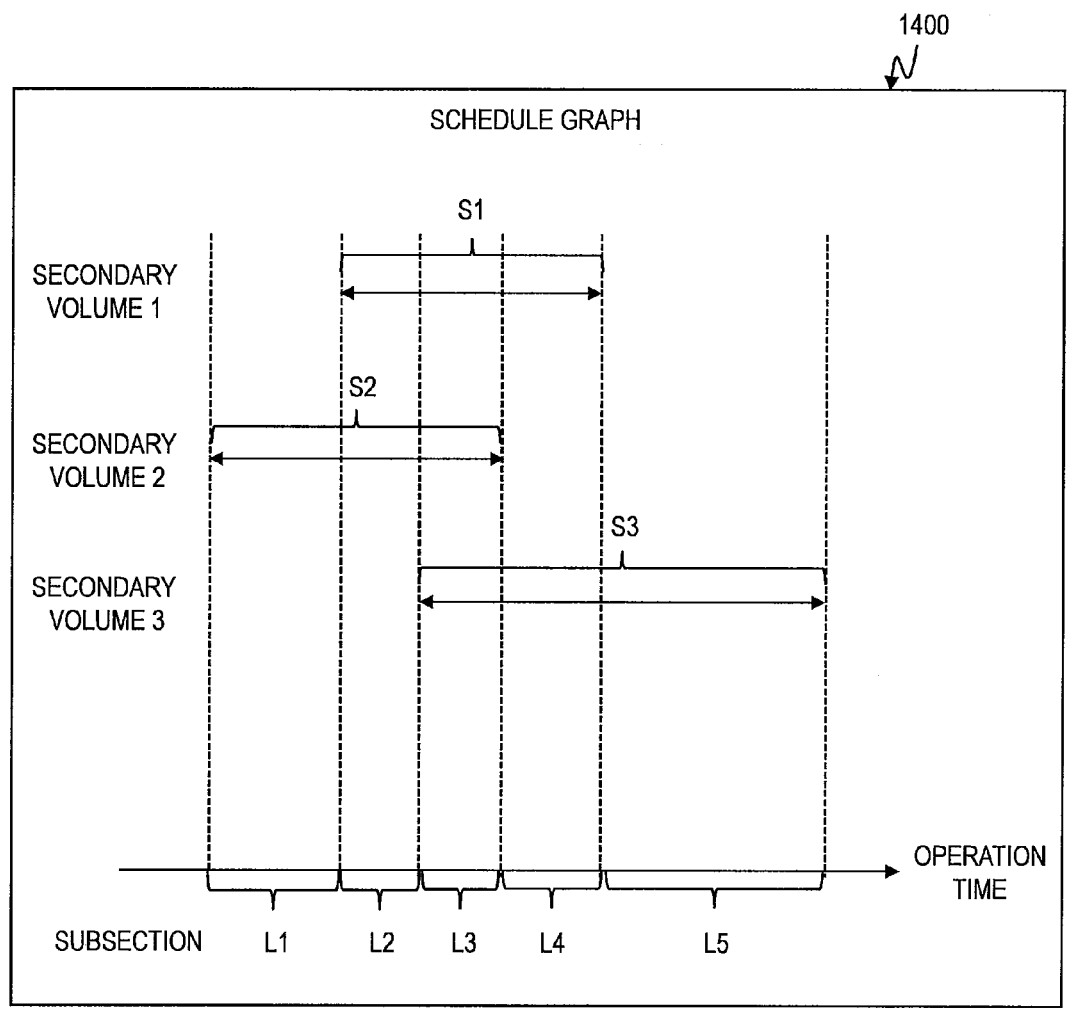
FIGS. 13A and 13B are explanatory diagrams each illustrating a method of judging secondary volumes having an identical or similar operation schedule in accordance with the embodiment of this invention.
Figure 13B:
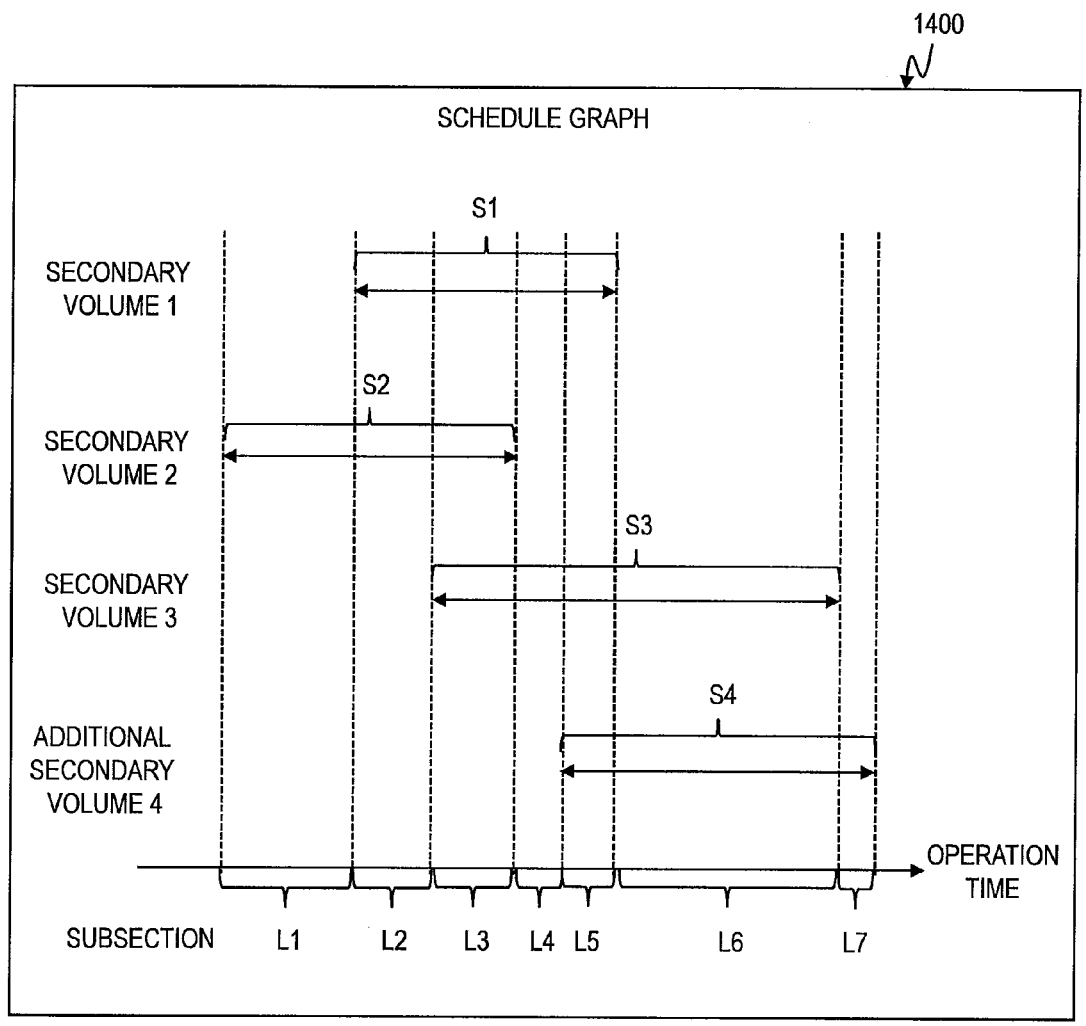

FIGS. 13A and 13B illustrate a method of judging secondary volumes having an identical or similar operation schedule according to the embodiment of this invention.

There is an array group 330 which includes three secondary volumes 1, 2, and 3, and operation periods of the secondary volumes are respectively S1, S2, and S3. First, a schedule section overlapping degree G_k of the array group 330 before migration is calculated.

Specifically, the pair integration management server 100 refers to the operation schedule table 800 to create a schedule graph 1400 with an axis of abscissa indicating time illustrated in FIG. 13A.

The pair integration management server 100 forms a section between end points of each operation period, in other words, between operation start time and operation end time, and creates subsections L_k (L_1 to L_5) from each section. In this case, k denotes the number of subsections.

The pair integration management server 100 calculates the numbers of secondary volumes operated in the subsections L_k (L_1 to L_5) as schedule overlapping degrees M_k (M_1 to M_5). Specifically, schedule overlapping degrees M_1 to M_5 of the subsections L_1 to L5 are respectively "1", "2", "3", "2", and "1".

The pair integration management server 100 calculates a schedule section overlapping degree G_k (G_5 in this case) by using the subsections L_k (L_1 to L_5) and the schedule overlapping degrees M_k (M_1 to M_5), specifically by the following Expression (1):

$$G\_k = \Sigma\_k(M\_k \times L\_k)/\Sigma\_k L\_k \quad \text{Expression (1)}$$

Then, a schedule section overlapping degree G_k when a secondary volume to be migrated is added is calculated.

The pair integration management server 100 adds an operation period S4 of the secondary volume to be migrated to the schedule graph 1400 to create new subsections L_k (L_1 to L_6) illustrated in FIG. 13B. The pair integration management server 100 calculates schedule overlapping degrees M_k (M_1 to M_6) in the subsections L_k (L_1 to L_6), and substitutes the subsections L_k (L_1 to L_6) and the schedule overlapping degrees M_k (M_1 to M_6) for Expression (1) to calculate a schedule section overlapping degree G_k (G_6 in this case).

The pair integration management server 100 compares the schedule section overlapping degrees G_5 and G_6 with each other. If a value of G_6 is larger than or equal to that of G_5, the pair integration management server 100 judges that secondary volumes having the operation period S4 are secondary volumes having an identical or similar operation schedule.

More generally, when the following Expression (2) is satisfied, secondary volumes having an identical or similar operation schedule are judged to be present:

$$G\_k+1 > G\_k \quad \text{Expression (2)}$$

The method of judging secondary volumes having an identical or similar operation schedule is not limited to the above. For example, when operations of the secondary volumes are started on the same day of the week, secondary volumes having an identical or similar operation schedule may be judged to be present.

Figure 14:
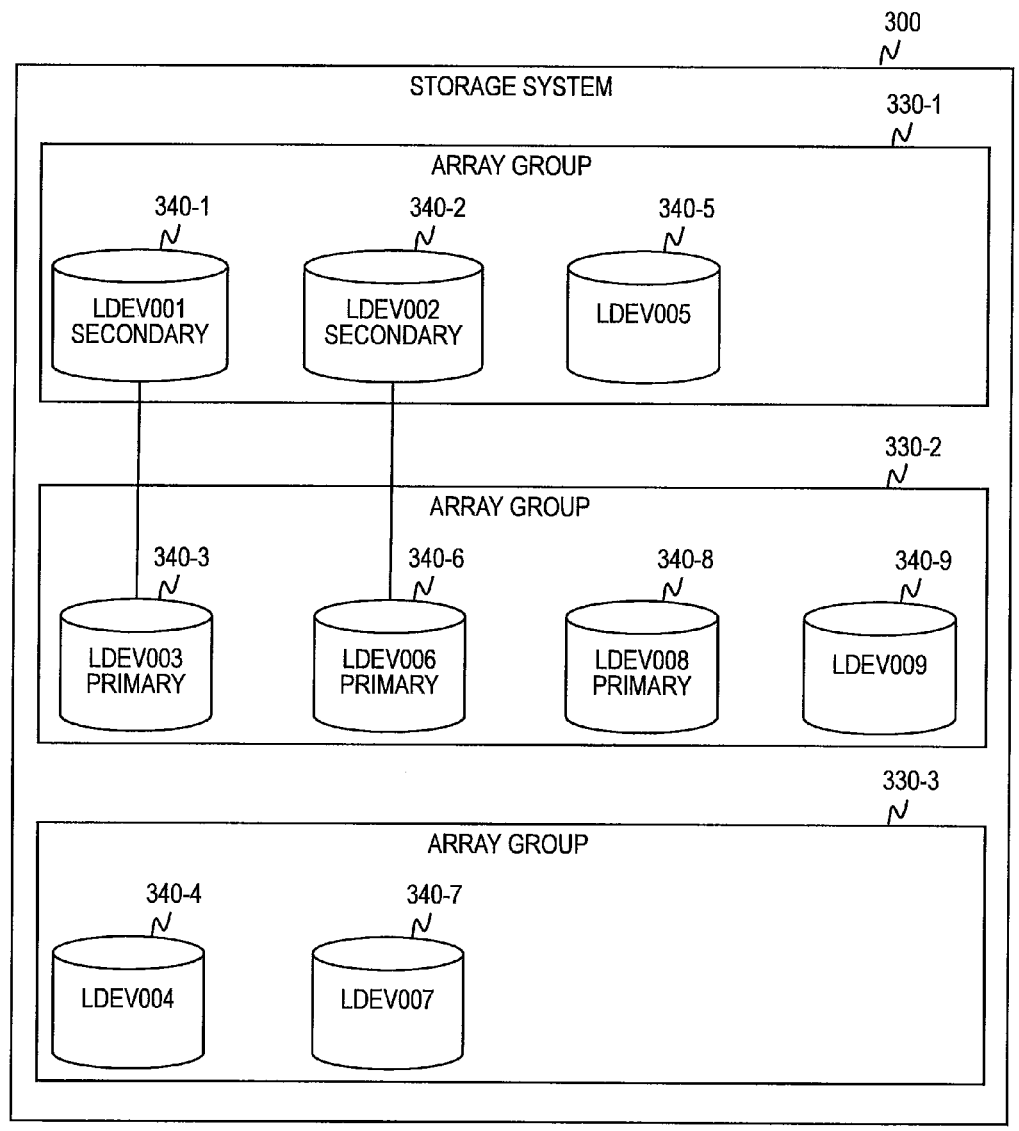
FIG. 14 is an explanatory diagram illustrating a status of the storage system after execution of the second processing in accordance with the embodiment of this invention.

FIG. 14 illustrates a status of the storage system 300 after execution of the second processing according to the embodiment of this invention. In the illustrated status, automatic migration is active.

When the second processing is executed in the status of the storage system 300 illustrated in FIG. 10, in Step 1203, for the array groups 330-1 and 330-3 in which secondary volumes are present, whether or not secondary volumes having an identical or similar operation schedule are present is judged.

Specifically, when a schedule section overlapping degree G_k of the array group 330-1 is "1", and when the volume 340-4 which is a secondary volume of the array group 330-3 is migrated to the array group 330-1, a schedule section overlapping degree G_k becomes "37/24", which is larger than a value of a schedule section overlapping degree G_k before the migration. Thus, the process proceeds to Step 1204.

In Step 1204, the volumes 340-1 and 340-5 which have not been used are present in the array group 330-1 as a migration destination candidate, secondary volumes are present therein, and operation schedules of the secondary volumes are overlapped, and thus the third condition on the secondary volume side is satisfied. Thus, the process proceeds to Step 1205, and automatic migration is executed in Step 1207.

Through the aforementioned processing, as illustrated in FIG. 14, the migration target volume 340-7 has been migrated to the volume 340-1.

The second processing eliminates the necessity of operating the array group 330-3, and the operation periods are overlapped in the array group 330-1. Thus, power of the storage system 300 can be efficiently managed.

The execution of the first processing and the second processing reduces the number of operated array groups 330 (330-1 to 330-3) more in the storage system 300 in the status of FIG. 14 than in the storage system 300 in the status of FIG. 6, and shortens the operation period of the operated array group 330 (330-1 to 330-3). As a result, power saving can be realized.

The third processing will be described below. The third processing is executed in the status of the storage system 300 illustrated in FIG. 14.

Figure 15A:
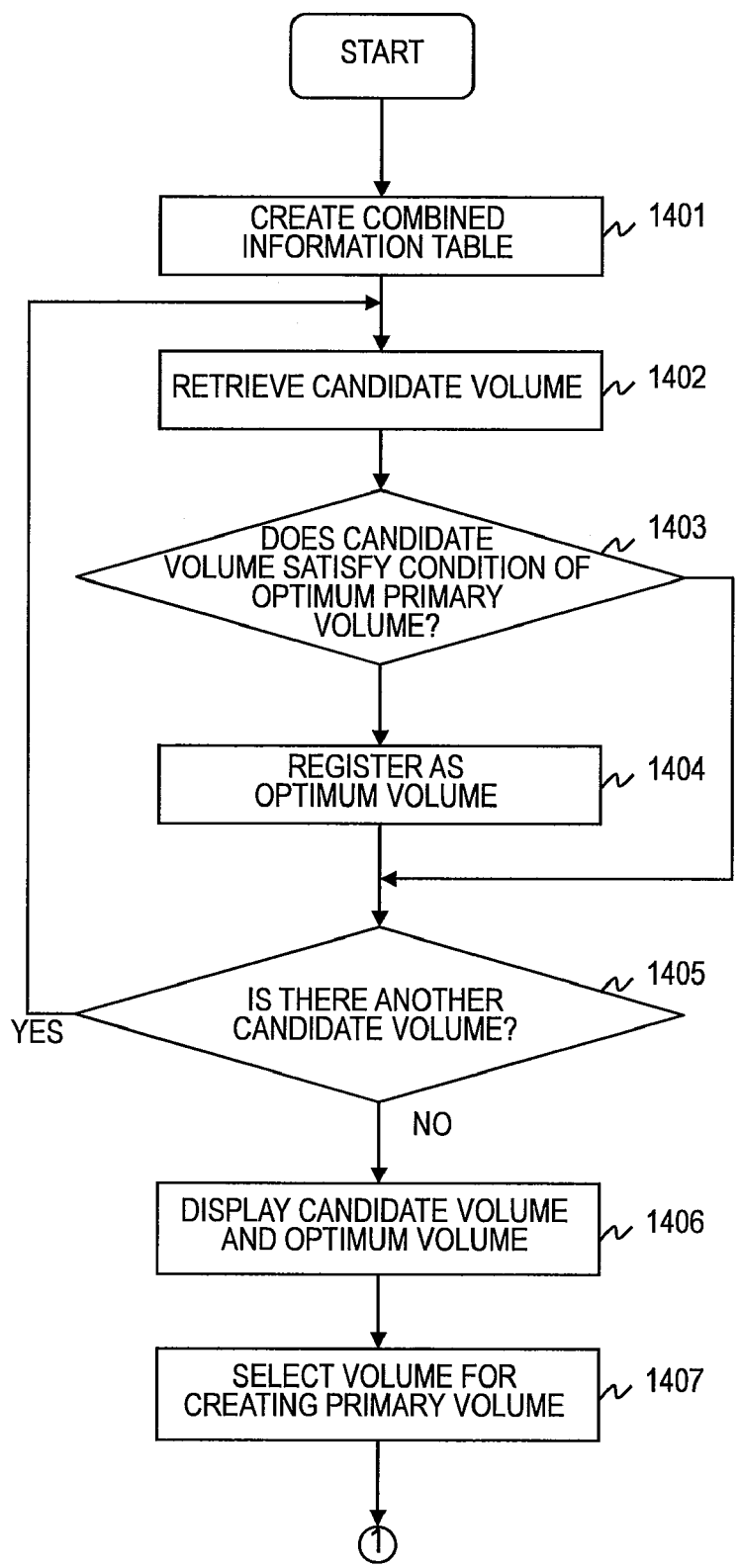
FIGS. 15A and 15B are flowcharts illustrating the third processing executed by the pair integration management server in accordance with the embodiment of this invention.
Figure 15B:
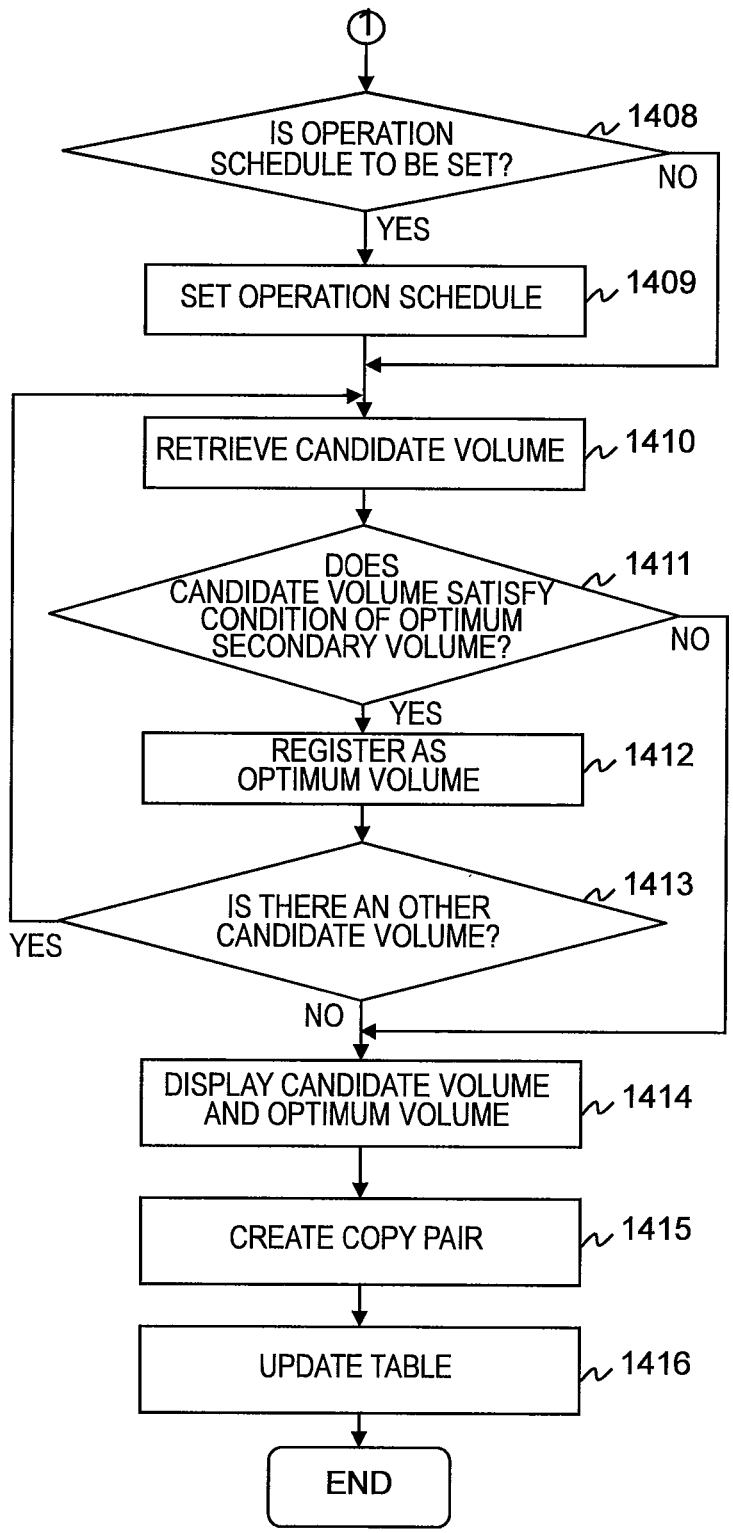

FIGS. 15A and 15B are flowcharts illustrating the third processing executed by the pair integration management server 100 according to the embodiment of this invention.

The third processing is executed by a user's instruction.

The pair integration management server 100 obtains pieces of information from the volume information table 600, the copy pair information table 700, and the operation schedule table 800 to create the combined information tables 1000 and 1300 (1401).

The pair integration management server 100 refers to the combined information table 1000 to retrieve a candidate volume. The candidate volume is a volume 340 which has not been used. The pair integration management server 100 retrieves a copy pair and a candidate volume present in an array group 330 in which a copy pair is to be created (1402).

The pair integration management server 100 judges, for the retrieved candidate volume, whether or not the retrieved candidate volume is a volume 340 satisfying a condition of an optimum primary volume (1403). The condition of the optimum primary volume is similar to that in the first processing.

If it is judged that the retrieved candidate volume is not a volume 340 satisfying the condition of the optimum primary volume, the pair integration management server 100 proceeds to Step 1405.

If it is judged that the retrieved candidate volume is a volume 340 satisfying the condition of the optimum primary volume, the pair integration management server 100 registers the candidate volume as an optimum volume (1404).

The pair integration management server 100 judges whether or not there is another candidate volume in addition to the retrieved candidate volume (1405).

If it is judged that there is another candidate volume in addition to the retrieved candidate volume, the pair integration management server 100 returns to Step 1402 to execute similar processing.

If it is judged that there is no other candidate volume in addition to the retrieved candidate volume, the pair integration management server 100 displays the candidate volumes of the primary volumes to the user (1406). In this case, the candidate volume registered as the optimum volume is displayed with emphasis.

After selection of a candidate volume for creating a primary volume by the user (1407), the user selects whether to set an operation schedule of a secondary volume (1408). In Step 1407, the pair integration management server 100 adds an identifier (not shown) indicating reservation on the primary side to the volume selected as the candidate volume for creating a primary volume by the user.

If no operation schedule of a secondary volume is set, the pair integration management server 100 proceeds to Step 1410.

If an operation schedule of a secondary volume is set, the user sets an operation schedule of the secondary volume (1409). Specifically, the user sets time, a day of the week, a date, and a cycle of an operation start, and time, a day of the week, a date, and a cycle of an operation stop. The time, the day of the week, the date, and the cycle respectively correspond to the time 804, the day of the week 805, the date 806, and the cycle 807 of the operation schedule table 800. The set operation schedule of the secondary volume is stored in the operation schedule table 800 after creation of a copy pair. Not all the aforementioned items have to be set.

The pair integration management server 100 refers to the combined information table 1000 to retrieve a candidate volume (1410). However, the volume to which the identifier indicating the reservation on the primary side has been added is removed from a retrieval target.

The pair integration management server 100 judges, for the retrieved candidate volume, whether or not the retrieved candidate volume is a volume 340 satisfying a condition of an optimum secondary volume (1411). The condition of the optimum secondary volume is the same as that in the second processing. Judgment of the third condition on the secondary volume side is executed by the same processing as that of FIGS. 13A and 13B.

Specifically, the pair integration management server 100 refers to the combined information table 1300 and the operation schedule of the secondary volume set in Step 1409 to judge whether or not the volume satisfies the condition of the optimum secondary volume. If no operation schedule of the secondary volume has been set, the pair integration management server 100 judges that the candidate volume is a volume 340 which does not satisfy the condition of the optimum secondary volume.

If it is judged that the retrieved candidate volume is not a volume 340 satisfying the condition of the optimum secondary volume, the pair integration management server 100 proceeds to Step 1413.

If it is judged that the retrieved candidate volume is a volume 340 satisfying the condition of the optimum secondary volume, the pair integration management server 100 registers the candidate volume as an optimum volume (1412).

The pair integration management server 100 judges whether or not there is another candidate volume in addition to the retrieved candidate volume (1413).

If it is judged that there is another candidate volume in addition to the retrieved candidate volume, the pair integration management server 100 returns to Step 1410 to execute similar processing.

If it is judged that there is no other candidate volume in addition to the retrieved candidate volume, the pair integration management server 100 displays the candidate volumes of the secondary volumes to the user (1414). In this case, the candidate volume registered as the optimum volume is displayed with emphasis.

The user selects a volume 340 for creating a secondary volume from the displayed candidate volumes to create primary and secondary volumes (1415). In other words, the user creates a copy pair.

The pair integration management server 100 updates the respective tables (volume information table 600, copy pair information table 700, and operation schedule table 800) to finish the third processing (1416).

The aforementioned processing enables the user to select a volume 340 capable of realizing power saving. As a result, power of the storage system 300 can be efficiently managed.

In the embodiment of this invention, when a volume 340 as a secondary volume for creating a copy pair creates a copy pair as a primary volume with another volume 340, the another volume 340 is treated as a secondary volume.

Figure 16:
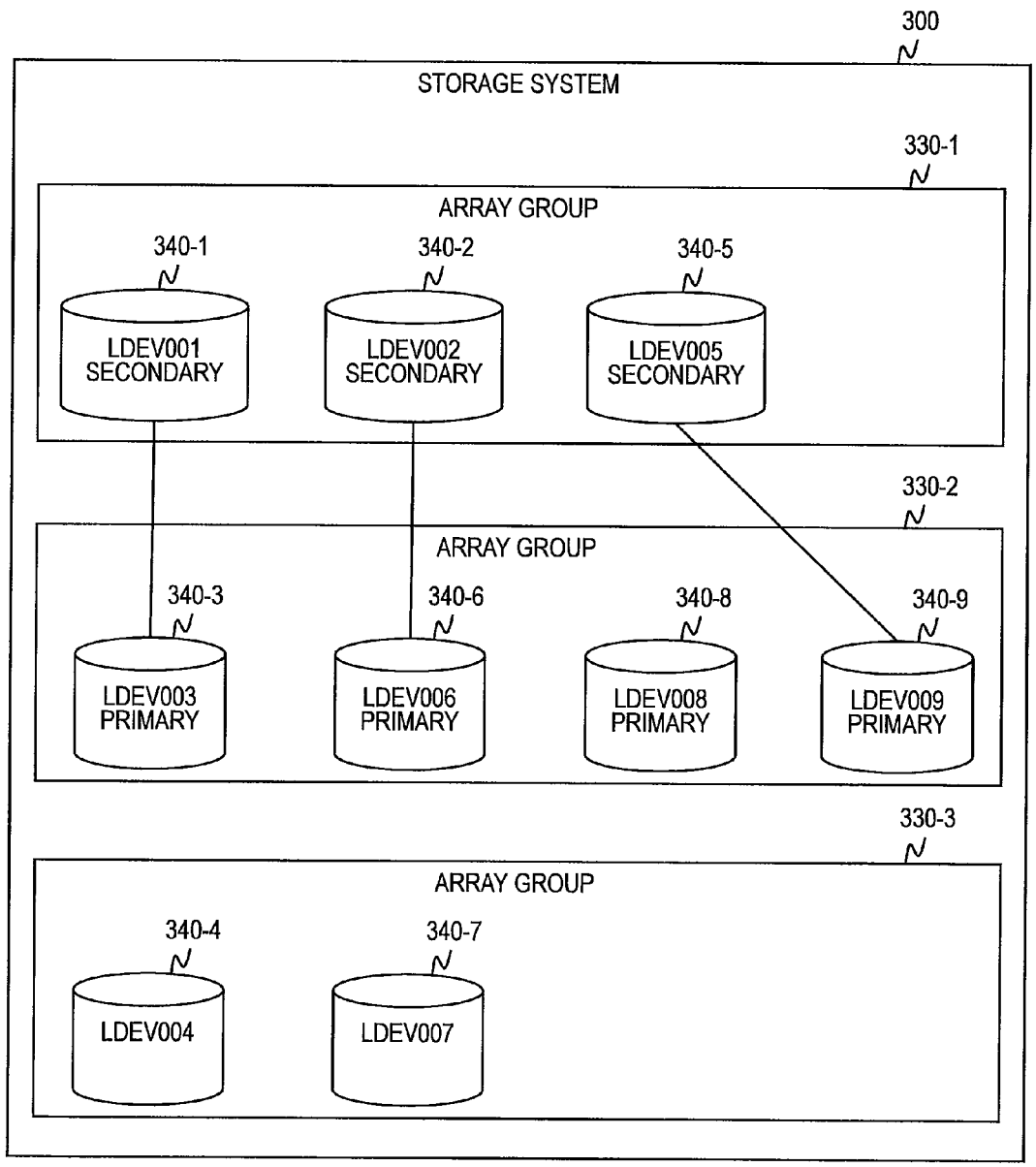
FIG. 16 is an explanatory diagram illustrating a status of the storage system after the execution of the third processing in accordance with the embodiment of this invention.

FIG. 16 illustrates a status of the storage system 300 after the execution of the third processing according to the embodiment of this invention.

When the third processing is executed in the status of the storage system 300 illustrated in FIG. 14, in Step 1402, the volumes 340-4, 340-5, 340-7, and 340-9 are candidate volumes, and whether or not each of the volumes 340 is a volume 340 satisfying a condition of an optimum primary volume is judged.

In Step 1404, the volume 340-9 is registered as an optimum volume. In the illustrated case, in Step 1407, the user selects the volume 340-9 as a volume 340 for creating a primary volume.

If, in Steps 1409 and 1410, the user sets operation time of a secondary volume to "7:00 to 22:00 on Tuesday, every week", in Step 1412, the volume 340-5 is registered as an optimum volume.

In Step 1415, the user selects the volume 340-5 as a volume 340 for creating a secondary volume to create a copy pair.

Through the aforementioned processing, the storage system 300 is set in the status as illustrated in FIG. 16.

According to the embodiment of this invention, the first processing and the second processing are independently executed. However, the first processing and the second processing may be simultaneously executed. Specifically, a volume 340 satisfying the condition on the primary volume side is retrieved, and a volume 340 satisfying the condition on the secondary volume side is retrieved. In this case, the condition on the secondary volume side includes the third condition on the secondary volume side.

According to the embodiment of this invention, whether or not the volume 340 created in the array group 330 satisfies the condition on the primary or secondary volume side is judged. However, judgment is not limited to this case. For example, the pair integration management server 100 judges, when a new volume 340 is created in the array group 330, whether or not the created volume 340 satisfies the condition on the primary or secondary volume side. If the volume 340 is judged to satisfy the aforementioned condition, the pair integration management server 100 may notify the user of the array group 330.

According to this invention, the pair integration management server 100 executes the first processing, the second processing, and the third processing. In a small system, however, the storage system 300 may execute the first processing, the second processing, and the third processing. Specifically, the controller 310 of the storage system 300 may collect pieces of information regarding a copy pair of the storage system 300 to execute the processing illustrated in each of FIGS. 7, 11, 15A, and 15B. Thus, even in the small system, power of the storage system 300 can be efficiently managed, and the power saving function of the storage system 300 can be effectively utilized.

While the present invention has been described in detail and pictorially in the accompanying drawings, the present invention is not limited to such detail but covers various obvious modifications and equivalent arrangements, which fall within the purview of the appended claims.

What is claimed is:

1. A storage area management method used in a computer system which includes a plurality of host computers, a plurality of storage systems, and a management computer coupled to the plurality of storage systems,
    each of the plurality of storage systems including a plurality of storage devices, and a controller for controlling the plurality of storage devices, the controller including a first interface coupled to the plurality of host computers, a second interface coupled to the plurality of storage devices, a processor coupled to the first interface and the second interface, and a memory coupled to the processor,
    each of the plurality of host computers including an interface coupled to the plurality of storage systems, a processor coupled to the interface, and a memory coupled to the processor, the each of the plurality of storage systems further including a plurality of storage device groups each including at least one storage device,
    the each of the plurality of storage systems being configured to:
        create a plurality of logical volumes by using real storage areas of a plurality of the storage devices included in the plurality of storage device groups to provide the created plurality of logical volumes to the plurality of host computers; and
        create a copy pair which includes a primary logical volume to be provided to one of the plurality of host computers which executes a task, and a secondary logical volume for saving a copy of data stored in the primary logical volume,
    the storage area management method comprising:
        a first step of obtaining, by the management computer, information on the plurality of storage device groups and information on the copy pair from the plurality of storage systems;
        a second step of retrieving, by the management computer, at least one candidate logical volume for creating the primary logical volume from the plurality of storage device groups of the plurality of storage systems by referring to the obtained information on the copy pair;
        a third step of judging, by the management computer, whether or not the retrieved at least one candidate logical volume on a primary side satisfies a condition of the primary logical volume;
        a fourth step of setting, by the management computer, an operation schedule of the secondary logical volume, wherein the operation schedule includes operation period information for secondary logical volumes;
        a fifth step of retrieving, by the management computer, at least one candidate logical volume for creating the secondary logical volume from the plurality of storage device groups by referring to the obtained information on the copy pair;
        a sixth step of comparing, by the management computer, an operation period of the retrieved at least one candidate logical volume on a secondary side with operation period information in the operation schedule; and judging, by the management computer, whether a result of the comparison indicates that the retrieved at least one candidate logical volume on the secondary side satisfies a secondary logical volume condition; and
        a seventh step of creating, by the management computer, a copy pair from the at least one candidate logical volume on the primary side and the at least one candidate logical volume on the secondary side that satisfies the secondary logical volume condition, based on results of the second and the fifth steps of retrieving, results of the third and the fourth steps of judging, and the sixth step of comparing and judging.

2. The storage area management method according to claim 1, wherein:
    the third step includes steps of:
        judging, by the management computer, whether or not a storage device group, which includes the primary logical volume but excludes the secondary logical volume, includes the retrieved at least one candidate logical volume on the primary side; and
        determining, by the management computer, in a case where it is judged that the storage device group, which includes the primary logical volume but excludes the secondary logical volume, includes the retrieved at least one candidate logical volume on the primary side, the candidate logical volume on the primary side satisfying a condition of the judging as an optimum candidate logical volume on the primary side; and
    the seventh step includes steps of:
        determining, by the management computer, the logical volume from the retrieved at least one candidate logical volume on the primary side in order to reduce a number of storage device groups to be operated; and
        creating, by the management computer, the primary logical volume by using the determined logical volume.

3. The storage area management method according to claim 1, wherein:
    the sixth step includes steps of:
        judging, by the management computer, whether or not a storage device group, which includes the secondary logical volume but excludes the primary logical volume, includes the retrieved at least one candidate logical volume on the secondary side; and
        determining, by the management computer, in a case where it is judged that the storage device group, which includes the secondary logical volume but excludes the primary logical volume, includes the retrieved at least one candidate logical volume on the secondary side, the candidate logical volume on the secondary side satisfying a condition of the judging as an optimum candidate volume on the secondary side;

the sixth step includes:
  making a comparison, by the management computer, for an overlapping degree between the set operation schedule and an operation period of the secondary logical volume included in the storage device group in which the retrieved at least one candidate logical volume is present; and the seventh step includes:
  creating the secondary logical volume by using the at least one candidate logical volume on the secondary side included in the plurality of storage device groups in a case where the overlapping degree is equal to or larger than a predetermined value.

4. The storage management method according to claim 3, wherein the overlapping degree is obtained by setting end points of operation periods of a plurality of the secondary logical volumes as boundaries, generating a subsection with two of the boundaries, between which other boundaries are absent, setting the number of the subsections k, setting the subsection as L_k, and calculating a number of the secondary logical volumes which are operating in the subsection as a schedule overlapping degree M_k, and employing the following expression using the subsection L_k and the schedule overlapping degree M_k:

$$G\_k = \Sigma\_k(M\_k \times L\_k)/\Sigma\_k L\_k.$$

5. The storage area management method according to claim 1, further comprising steps of, after the seventh step:
  updating, by the each of the plurality of storage systems, the information on the copy pair; and
  obtaining, by the management computer, the updated information on the copy pair.

6. The storage area management method according to claim 1, further comprising:
  an eighth step of judging, by the management computer, whether or not there is a storage device group in which the primary logical volume and the secondary logical volume are mixedly present by referring to the obtained information on the copy pair;
  a ninth step of judging, by the management computer, whether or not a logical volume satisfying the condition of the primary logical volume is present in a storage device group in which the primary logical volume and the secondary logical volume are not mixedly present in a case where it is judged that there is a storage device group in which the primary logical volume and the secondary logical volume are mixedly present;
  a tenth step of judging, by the management computer, whether or not a logical volume satisfying the condition of the secondary logical volume is present in the storage device group in which the primary logical volume and the secondary logical volume are not mixedly present;
  an eleventh step of migrating, by the management computer, based on results of the eighth to tenth steps of judging, one of the primary logical volume and the secondary logical volume included in the storage device group in which the primary logical volume and the secondary logical volume are mixedly present to one of the logical volume satisfying the condition of the primary logical volume and the logical volume satisfying the condition of the secondary logical volume, which are included in the storage device group in which the primary logical volume and the secondary logical volume are not mixedly present;
  a twelfth step of judging, by the management computer, whether or not a secondary logical volume which has an operation period overlapping an operation schedule of a migration target secondary logical volume is present in a storage device group which excludes the migration target secondary logical volume by referring to the obtained information on the copy pair; and
  a thirteenth step of judging, by the management computer, whether or not the secondary logical volume which has the overlapping operation period is the logical volume satisfying the condition of the secondary logical volume in a case where it is judged that the secondary logical volume which has the operation period overlapping the operation schedule of the migration target secondary logical volume is present in the storage device group which excludes the migration target secondary logical volume; and a fourteenth step of migrating, by the management computer, based on results of the thirteenth steps of judging, the migration target secondary logical volume to the secondary logical volume which has the overlapping operation period included in the storage device group.

7. The storage area management method according to claim 6, wherein:
  the ninth step includes steps of:
    judging, by the management computer, whether or not a storage device group, which includes the primary logical volume but excludes the secondary logical volume, includes at least one logical volume included in the storage device group in which the primary logical volume and the secondary logical volume are not mixedly present; and
    determining, by the management computer, in a case where it is judged that the storage device group, which includes the primary logical volume but excludes the secondary logical volume, includes at least one logical volume included in the storage device group in which the primary logical volume and the secondary logical volume are not mixedly present, the at least one logical volume satisfying a condition of the judging as at least one candidate volume on the primary side; and
  the eleventh step includes steps of:
    determining, by the management computer, a migration destination logical volume from the at least one candidate volume on the primary side in order to reduce a number of storage device groups to be operated; and
    migrating, by the management computer, the primary logical volume to the determined migration destination logical volume.

8. The storage area management method according to claim 6, wherein:
  the tenth step includes steps of:
    judging, by the management computer, whether or not a storage device group, which includes the secondary logical volume but excludes the primary logical volume, includes at least one logical volume included in the storage device group in which the primary logical volume and the secondary logical volume are not mixedly present; and
    determining, by the management computer, in a case where it is judged that the storage device group, which includes the secondary logical volume but excludes the primary logical volume, includes at least one logical volume included in the storage device group in which the primary logical volume and the secondary logical volume are not mixedly present, the at least one logical volume satisfying a condition of the judging as at least one candidate volume on the secondary side; and the eleventh step includes steps of:
determining, by the management computer, a migration destination logical volume from the at least one candidate volume on the secondary side in order to reduce a number of storage device groups to be operated; and
migrating, by the management computer, the secondary logical volume to the determined migration destination logical volume.

9. The storage area management method according to claim 6, wherein:

the twelfth step includes steps of:
judging, by the management computer, whether or not a storage device group, which includes the secondary logical volume but excludes the primary logical volume, and which includes the secondary logical volume having the operation period overlapping the operation schedule of the migration target secondary logical volume, includes at least one logical volume included in the storage device group excluding the migration target secondary logical volume; and
determining, by the management computer, in a case where it is judged that the storage device group, which includes the secondary logical volume but excludes the primary logical volume, and which includes the secondary logical volume having the operation period overlapping the operation schedule of the migration target secondary logical volume, includes at least one logical volume included in the storage device group excluding the migration target secondary logical volume, the at least one logical volume satisfying a condition of the judging as at least one candidate volume on the secondary side; and the thirteenth step includes steps of:
making a comparison for an overlapping degree between the operation schedule of the migration target secondary logical volume and the operation period of the secondary logical volume included in the storage device group including the at least one candidate volume on the secondary side; and
migrating the migration target secondary logical volume to the at least one logical volume included in the storage device group including the secondary logical volume satisfying the condition in a case where the overlapping degree is equal to or larger than a predetermined value.

10. A computer system, comprising:
a plurality of storage systems; and
a management computer coupled to the plurality of storage systems, wherein:
each of the plurality of storage systems includes a plurality of storage devices, and a controller for controlling the plurality of storage devices;
the controller includes an interface coupled to the plurality of storage devices, a processor coupled to the interface, and a memory coupled to the processor; the each of the plurality of storage systems further includes a plurality of storage device groups each including at least one storage device, and is configured to:
create a plurality of logical volumes by using real storage areas of a plurality of the storage devices included in the plurality of storage device groups; and
create a copy pair which includes a primary logical volume used for executing a task, and a secondary logical volume for saving a copy of data stored in the primary logical volume; and the management computer includes an interface coupled to a network, a processor coupled to the interface, and a memory coupled to the processor;
the management computer is configured to:
obtain information on the plurality of storage device groups and information on the copy pair from the plurality of storage systems;
retrieve at least one candidate logical volume for creating the primary logical volume from the plurality of storage device groups of the each of the plurality of storage systems by referring to the obtained information on the copy pair;
judge whether or not the retrieved at least one candidate logical volume on a primary side satisfies a condition of the primary logical volume;
set an operation schedule of the secondary logical volume,
wherein the operation schedule includes operation period information for secondary logical volumes;
retrieve at least one candidate logical volume for creating the secondary logical volume from the plurality of storage device groups by referring to the obtained information on the copy pair;
compare an operation period of the retrieved at least one candidate logical volume on a secondary side with operation period information in the operation schedule;
judge whether a result of the comparison indicates that the retrieved at least one candidate logical volume on a secondary side satisfies a secondary logical volume condition by referring to the set operation schedule; and
create a copy pair from the at least one candidate logical volume on the primary side and the at least one candidate logical volume on the secondary side that satisfies the secondary logical volume condition, based on results of the retrieving, results of the comparing, and results of the judging.

11. The computer system according to claim 10, wherein the management computer is further configured to:
judge whether or not a storage device group, which includes the primary logical volume but excludes the secondary logical volume, includes the retrieved at least one candidate logical volume on the primary side for checking if the retrieved at least one candidate logical volume on the primary side satisfies the condition of the primary logical volume;
determine the candidate logical volume on the primary side satisfying the condition of the judging as an optimum candidate logical volume on the primary side in a case where it is judged that a condition of the judging is satisfied;
determine the logical volume from the retrieved at least one candidate logical volume on the primary side in order to reduce a number of storage device groups to be operated for creating the copy pair from the at least one candidate logical volume on the primary side and the at least one candidate logical volume on the secondary side; and create the primary logical volume by using the determined logical volume.

12. The computer system according to claim 10, wherein the management computer is further configured to:
   judge whether or not a storage device group, which includes the secondary logical volume but excludes the primary logical volume, includes the retrieved at least one candidate logical volume on the secondary side for checking if the retrieved at least one candidate logical volume on the secondary side satisfies the condition of the secondary logical volume;
   determine the candidate logical volume on the secondary side satisfying the condition of the judging as an optimum candidate volume on the secondary side in a case where it is judged that a condition of the judging is satisfied; make a comparison for an overlapping degree between the set operation schedule and an operation period of the secondary logical volume included in the storage device group in which the retrieved at least one candidate logical volume is present, for creating the copy pair from the at least one candidate logical volume on the primary side and the at least one candidate logical volume on the secondary side; and
   create the secondary logical volume by using the at least one candidate logical volume on the secondary side included in the plurality of storage device groups in a case where the overlapping degree is equal to or larger than a predetermined value.

13. The computer system according to claim 12, wherein the overlapping degree is obtained by setting end points of operation periods of a plurality of the secondary logical volumes as boundaries, generating a subsection with two of the boundaries, between which other boundaries are absent, setting the number of the subsections k, setting the subsection as L_k, and calculating a number of the secondary logical volumes which are operating in the subsection as a schedule overlapping degree M_k, and based on the following expression using the subsection L_k and the schedule overlapping degree M_k:

$$G\_k = \Sigma\_k(M\_k \times L\_k)/\Sigma\_k L\_k.$$

14. The computer system according to claim 10, wherein:
   the each of the plurality of storage systems updates the information on the copy pair after creating the copy pair from the at least one candidate logical volume on the primary side and the at least one candidate logical volume on the secondary side; and
   the management computer obtains the updated information on the copy pair from the plurality of storage systems.

15. The computer system according to claim 10, wherein the management computer is further configured to:
   judge whether or not there is a storage device group in which the primary logical volume and the secondary logical volume are mixedly present by referring to the obtained information on the copy pair;
   judge whether or not a logical volume satisfying the condition of the primary logical volume is present in a storage device group in which the primary logical volume and the secondary logical volume are not mixedly present in a case where it is judged that there is a storage device group in which the primary logical volume and the secondary logical volume are mixedly present;
   judge whether or not a secondary logical volume satisfying the condition of the secondary logical volume is present in the storage device group in which the primary logical volume and the secondary logical volume are not mixedly present;
   migrate, based on results of the judging, one of the primary logical volume and the secondary logical volume included in the storage device group in which the primary logical volume and the secondary logical volume are mixedly present to one of the logical volume satisfying the condition of the primary logical volume and the logical volume satisfying the condition of the secondary logical volume included in the storage device group in which the primary logical volume and the secondary logical volume are not mixedly present;
   judge whether or not a secondary logical volume which has an operation period overlapping an operation schedule of a migration target secondary logical volume is present in a storage device group which excludes the migration target secondary logical volume by referring to the obtained information on the copy pair;
   judge, in a case where it is judged that the secondary logical volume which has the operation period overlapping the operation schedule of the migration target secondary logical volume is present in the storage device group which excludes the migration target secondary logical volume, whether or not the secondary logical volume which has the overlapping operation period is the logical volume satisfying the condition of the secondary logical volume; and
   migrate, based on results of the judging, the migration target secondary logical volume to the logical volume which has the overlapping operation period included in the storage device group.

16. A computer system, comprising:
a plurality of hosts; a plurality of storage systems; and
a pair integration management server, wherein:
   the pair integration management server is coupled to the plurality of hosts and the plurality of storage systems via a network;
   each of the plurality of storage systems includes a plurality of disk devices, and a controller for controlling the plurality of disk devices;
   the controller includes a first interface coupled to the network, a second interface coupled to the plurality of disk devices, a processor coupled to the first interface and the second interface, and a memory coupled to the processor;
   the each of the plurality of hosts includes an interface coupled to a SAN, a processor coupled to the interface, and a memory coupled to the processor;
   the each of the plurality of storage systems further includes a plurality of array groups each including at least one disk device, and is configured to:
      create a plurality of logical volumes by using real storage areas of a plurality of the disk devices included in the plurality of array groups to provide the created plurality of logical volumes to the plurality of hosts; and
      create a copy pair which includes a primary volume to be provided to one of the plurality of hosts which executes a task, and a secondary
   volume for saving a copy of data stored in the primary volume; and
the pair integration management server is configured to:
   obtain information on the plurality of array groups and information on the copy pair from the plurality of storage systems;
   hold the obtained information to create a combined information table from the obtained information;
   judge whether or not there is an array group in which the primary volume and the secondary volume are mixedly present by referring to the created combined information table;
   judge whether or not an array group, which includes the primary volume but excludes the secondary volume, includes at least one volume included in the array group in which the primary volume and the secondary volume are not mixedly present in a case where it is judged that there is an array group in which the primary volume and the secondary volume are mixedly present;

determine, in a case where it is judged that the array group, which includes the primary volume and excludes the secondary volume, includes the at least one volume included in the array group in which the primary volume and the secondary volume are not mixedly present, the at least one volume satisfying a condition of the judging as at least one candidate volume on a primary side;

judge whether or not an array group, which includes the secondary volume but excludes the primary volume, includes the at least one volume in the array group in which the primary volume and the secondary volume are not mixedly present;

determine, in a case where it is judged that the array group, which includes the secondary volume and excludes the primary volume, includes the volume included in the array group in which the primary volume and the secondary volume are not mixedly present, the at least one volume satisfying a condition of the judging as at least one candidate volume on a secondary side;

determine, based on results of the judging, a migration destination volume from the at least one candidate volume on the primary side in order to reduce a number of array groups to be operated;

determine a migration destination volume from the at least one candidate volume on the secondary side in order to reduce the number of array groups to be operated; migrate the primary volume and the secondary volume to the determined migration destination volumes; judge whether or not an array group, which includes the secondary volume but excludes the primary volume, and which includes a secondary volume having an operation period overlapping an operation schedule of a migration target secondary volume includes at least one volume included in an array group that excludes the migration target secondary volume by referring to the obtained information on the copy pair, wherein the operation schedule includes operation period information for secondary logical volumes;

determine, in a case where it is judged that the array group, which includes the secondary volume but excludes the primary volume, and which includes the secondary volume having the operation period overlapping the operation schedule of the migration target secondary volume includes the at least one volume included in the array group that excludes the migration target secondary volume, the volume satisfying a condition of the judging as the at least one candidate volume on the secondary side;

make a comparison for an overlapping degree between the operation schedule of the migration target secondary volume and the operation period of the secondary volume included in the array group including the at least one candidate volume on the secondary side in a case where it is judged that the array group, which excludes the migration target secondary volume, includes the secondary volume having the operation period overlapping the operation schedule of the migration target secondary volume;

migrate the migration target secondary volume to the volume included in the array group including the secondary volume satisfying the condition in a case where the overlapping degree is equal to or larger than a predetermined value;

migrate, based on results of the judgments, the migration target secondary volume to the volume included in the array group which has the overlapping operation period;

retrieve at least one candidate volume for creating the primary volume from the plurality of array groups of the plurality of storage systems by referring to the obtained information on the copy pair;

judge whether or not the array group, which includes the primary volume but excludes the secondary volume includes the retrieved at least one candidate volume on the primary side;

register, in a case where it is judged that the array group, which includes the primary volume but excludes the secondary volume, includes the retrieved at least one candidate volume on the primary side, the candidate volume on the primary side satisfying a condition of the judging as an optimum volume on the primary side;

set an operation schedule of the secondary volume;

retrieve at least one candidate volume for creating the secondary volume from the plurality of array groups by referring to the obtained information on the copy pair;

judge whether or not the array group, which includes the secondary volume but excludes the primary volume, includes the retrieved at least one candidate volume on the secondary side by referring to the set operation schedule;

register, in a case where it is judged that the array group, which includes the secondary volume but excludes the primary volume, includes the retrieved at least one candidate volume on the secondary side, the candidate volume on the secondary side satisfying a condition of the judging as an optimum volume on the secondary side;

determine, based on results of the retrieving and results of the judging, a volume for creating a primary volume among the at least one candidate volume on the primary side and the optimum volume on the primary side in order to reduce the number of array groups to be operated;

make a comparison for an overlapping degree between the set operation schedule and the operation period of the secondary volume included in the array group, in which the retrieved at least one candidate volume is present;

determine a volume for creating the secondary volume among the at least one candidate volume on the secondary side and the optimum volume on the secondary side included in the array group in a case where the overlapping degree is equal to or larger than a predetermined value; and create the copy pair from the determined volume for creating the primary volume and the determined volume for creating the secondary volume.

* * * * *